US011425255B2

(12) United States Patent
Mazza et al.

(10) Patent No.: US 11,425,255 B2
(45) Date of Patent: *Aug. 23, 2022

(54) SYSTEM AND METHOD FOR DIALOGUE TREE GENERATION

(71) Applicant: Genesys Telecommunications Laboratories, Inc., Daly City, CA (US)

(72) Inventors: Arnon Mazza, Givatayim (IL); Avraham Faizakof, Kfar-Warburg (IL); Amir Lev-Tov, Bat-Yam (IL); Tamir Tapuhi, Ramat-Gan (IL); Yochai Konig, San Francisco, CA (US)

(*) Notice: Subject to any disclaimer, the term of this patent is extended or adjusted under 35 U.S.C. 154(b) by 244 days.

This patent is subject to a terminal disclaimer.

(21) Appl. No.: 16/664,907

(22) Filed: Oct. 27, 2019

(65) Prior Publication Data

US 2020/0059559 A1 Feb. 20, 2020

Related U.S. Application Data

(62) Division of application No. 15/840,295, filed on Dec. 13, 2017, now Pat. No. 10,498,898.

(51) Int. Cl.

| | |
|---|---|
| *G10L 15/16* | (2006.01) |
| *G10L 15/18* | (2013.01) |
| *G10L 15/26* | (2006.01) |
| *G10L 15/22* | (2006.01) |
| *H04M 3/527* | (2006.01) |
| *G06F 16/332* | (2019.01) |
| *H04M 3/51* | (2006.01) |
| *G10L 25/30* | (2013.01) |

(52) U.S. Cl.
CPC ........ *H04M 3/527* (2013.01); *G06F 16/3329* (2019.01); *G10L 15/16* (2013.01); *G10L 15/1815* (2013.01); *G10L 15/26* (2013.01); *H04M 3/5183* (2013.01); *G10L 15/22* (2013.01); *G10L 25/30* (2013.01)

(58) Field of Classification Search
CPC .......... G06F 17/20; G06F 17/21; G06F 17/27; G06F 17/30598
See application file for complete search history.

(56) References Cited

U.S. PATENT DOCUMENTS

| | | | |
|---|---|---|---|
| 9,965,460 B1 * | 5/2018 | Wasiuk | ................. G06F 17/278 |
| 2005/0022106 A1 | 1/2005 | Kawai | |
| 2008/0195595 A1 * | 8/2008 | Masuyama | ........... G06F 16/313 |

(Continued)

OTHER PUBLICATIONS

New Zealand Examination Report 1 received in co-pending New Zealand application No. 765941 dated May 5, 2021.
(Continued)

*Primary Examiner* — Paras D Shah

(57) ABSTRACT

A system and method are presented for dialogue tree generation. The dialogue tree may be used for generating a chatbot. Similar phrases from phrases comprising the interactions between a first party and a second party are group together from the first party of a cluster. For each group of similar phrases, percentages are determined and compared against a threshold occurrence rate. Anchors are generated and used in alignment in the determination of dialogue flows. Topic-specific dialogue trees may be determined from the dialogue flows. The topic-specific dialogue trees may be modified to generate a deterministic dialogue tree.

12 Claims, 19 Drawing Sheets

(56) References Cited

U.S. PATENT DOCUMENTS

| | | | |
|---|---|---|---|
| 2008/0275694 A1 | 11/2008 | Varone | |
| 2009/0089257 A1* | 4/2009 | Cho | G06F 16/954 |
| 2012/0041903 A1 | 2/2012 | Beilby | |
| 2013/0268260 A1 | 10/2013 | Lundberg | |
| 2013/0275875 A1 | 10/2013 | Gruber | |
| 2013/0317826 A1 | 11/2013 | Jerram et al. | |
| 2014/0122619 A1 | 5/2014 | Duan | |
| 2014/0279050 A1 | 9/2014 | Makar et al. | |
| 2015/0066479 A1 | 3/2015 | Pasupalak | |
| 2015/0095330 A1* | 4/2015 | Guo | G06F 16/335 707/734 |
| 2015/0178371 A1 | 6/2015 | Seth et al. | |
| 2016/0042359 A1 | 2/2016 | Singh | |
| 2016/0099843 A1 | 4/2016 | Krishnamoorthy | |
| 2016/0308795 A1 | 10/2016 | Cheng | |
| 2017/0116173 A1 | 4/2017 | Lev-Tov et al. | |
| 2017/0177717 A1* | 6/2017 | Raniere | G06F 16/345 |
| 2017/0344532 A1 | 11/2017 | Zhou et al. | |
| 2018/0025726 A1 | 1/2018 | Gatti de Bayser | |
| 2018/0097749 A1 | 4/2018 | Ventura | |
| 2018/0240135 A1 | 8/2018 | Reeves | |
| 2018/0314689 A1 | 11/2018 | Wang | |
| 2019/0171925 A1* | 6/2019 | Arnold | G06F 16/3329 |

OTHER PUBLICATIONS

International Search Report and Written Opinion of the International Searching Authority dated Mar. 26, 2019 in related PCT Application PCT/US18/64810 with an international filing date of Dec. 11, 2018.

EP Examination Report regarding co-pending application No. 18888490.2 dated Jan. 15, 2021.

Sumit Negi et al., "Automatically Extracting Dialog Models from Conversation Transcripts", Ninth IEEE International Conference on Data Mining, 2009 (ICDM '09), IEEE, Piscataway, NJ, USA Dec. 6, 2009, pp. 890-895.

Jack Cahn, "CHATBOT: Architecture, Design & Development Table of Contents", Apr. 26, 2017 URL: https://static1.squarespace.com/static/569293741c1210fdda37b429/t/59160b6bff7c50104e601a85/1494616940469/CHATBOT_thesis_final.pdf.

Vincent Lemaire, "Cluster-Based Graphs for Conceiving Dialog Systems VITIPI View Project Machine Learning View Project Jean-Leon Bouraoui Orange Labs 49 Publications 149 Citations See Profile", Sep. 30, 2017 URL: https://www.researchgate.net/profile/Vincent_Lemaire/publications/318961714_Cluster-Based_Graphs_for_Conceiving_Dialog_Systems/links/5a81bf9545851504fb354525/Cluster-Based-Graphs-for-Conceiving-Dialog-Systems.pdf.

Rich Charles et al., "Using Collaborative Discourse Theory to Partially Automate Dialogue Tree Authoring", Big Data Analytics In The Social and Ubiquitous Context : 5th International Workshop on Modeling Social Media, MSM 2014, 5th International Workshop on Mining Ubiquitous and Social Environments, Muse 2014 and First International Workshop on Machine LE.

Canadian Examination Report regarding CA application No. 3,085,315 dated Aug. 5, 2021.

* cited by examiner

SYSTEM AND METHOD FOR DIALOGUE TREE GENERATION

CROSS REFERENCE TO RELATED APPLICATIONS

This application is a divisional of and claims the benefit of U.S. patent application Ser. No. 15/840,295, titled "SYSTEMS AND METHODS FOR CHATBOT GENERATION", filed in the U.S. Patent and Trademark Office on Dec. 13, 2017, now Allowed, the contents of which are incorporated herein. This application is also related to U.S. patent application Ser. No. 16/664,904, titled "SYSTEMS AND METHODS FOR CHATBOT GENERATION", filed in the U.S. Patent and Trademark Office on Oct. 27, 2019.

FIELD

Aspects of embodiments of the present invention relate to the field of interactive chatbots and systems and methods for training and operating chatbots.

BACKGROUND

A chatbot or chat bot is a computer program that interacts with a human or another chatbot. The interaction is typically conducted over a text interface such as internet relay chat, web chat, instant messaging services (e.g., Google® Hangouts, Facebook® Messenger, WhatsApp®, LINE®, Jabber, etc.), short message service (SMS), direct messages on social networks such as LinkedIn®, Facebook®, and Twitter®, and the like. Chatbots may also interact with humans or other chatbots over other communications media, such as voice communications (e.g., by converting human speech to text using automatic speech recognition and providing audio responses from the chatbot using speech synthesis).

SUMMARY

Aspects of embodiments of the present invention are directed to systems and methods for automatically or semi-automatically generating chatbots and systems and methods for interacting with humans and other chatbots using the automatically (or semi-automatically) generated chatbots.

According to one embodiment of the present invention, a method is presented for constructing a deterministic dialogue tree for generating a chatbot, using a plurality of transcripts of interactions between a first party and a second party, the method comprising the steps of: grouping similar phrases of phrases comprising the interactions from the first party of a cluster; for each group of similar phrases: computing a percentage of interaction of the cluster containing at least one phrase from the group of similar phrases; determining whether the percentage exceeds a threshold occurrence rate; and in response to determining that the percentage exceeds the threshold occurrence rate, generating an anchor corresponding to the group of similar phrases; projecting the anchors onto the interactions of the cluster to represent the interactions as sequences of anchors; computing dialogue flows by aligning the sequences of anchors representing the interactions of the clusters; computing the topic-specific dialogue tree from the dialogue flows, wherein: each node of the topic-specific dialogue tree corresponds to an anchor, and each edge of the topic-specific dialogue tree connects a first node of the topic-specific dialogue tree to a second node of the topic-specific dialogue tree, and the edge corresponds to a plurality of keyphrases characterizing the customer phrases appearing, in the transcripts, in response to the first party phrases of the anchor corresponding to the first node and the first party phrases of the anchor corresponding to the second node are in response to the second party phrases of the edge; and modifying the topic-specific dialogue tree to generate a deterministic dialogue tree.

The method may further include: displaying, on a user interface, the label of each of the clusters; receiving a command to edit a label of the labels; and updating the label of the labels in accordance with the command.

The modifying may comprise pruning the topic-specific dialogue tree. Pruning may further comprise: identifying nodes of the topic-specific dialogue tree having at least two outgoing edges having overlapping customer phrases, each of the outgoing edges connecting a corresponding first node to a corresponding second node; identifying nodes of the topic-specific dialogue tree having at least two outgoing edges having overlapping customer phrases, each of the outgoing edges connecting a corresponding first node to a corresponding second node; removing the remaining edges from the tropic-specific dialogue tree.

Pruning may also comprise: identifying a first edge and second edge having overlapping customer phrases, the first edge corresponding to sequences of first party phrases most frequently observed in the transcripts of the cluster; and removing the second edge.

Modifying of the topic-specific dialogue tree may comprise modifying the phrases characterizing a transition. The modifying phrases may comprise inserting phrases or removing phrases.

Modifying of the topic-specific dialogue tree may also comprise adding a new edge between two nodes.

In an embodiment, the pruning of the topic-specific dialogue tree further comprises: displaying the topic-specific dialogue tree on a user interface; receiving, via the user interface, a command to modify the topic-specific dialogue tree; and updating the topic-specific dialogue tree in accordance with the command.

The pruning of the topic-specific dialogue tree may further comprise: displaying the topic-specific dialogue tree on a user interface; receiving, via the user interface, a command to modify the topic-specific dialogue tree; and updating the topic-specific dialogue tree in accordance with the command.

According to one embodiment of the present invention, a system is presented which includes: a processor; and memory storing instructions that, when executed by the processor, cause the processor to construct a deterministic dialogue tree for generating a chatbot using a plurality of transcripts of interactions between a first party and a second party, including instructions that cause the processor to: group similar phrases of phrases comprising the interactions from the first party of a cluster; for each group of similar phrases: compute a percentage of interaction of the cluster containing at least one phrase from the group of similar phrases; determine whether the percentage exceeds a threshold occurrence rate; and in response to determining that the percentage exceeds the threshold occurrence rate, generating an anchor corresponding to the group of similar phrases; project the anchors onto the interactions of the cluster to represent the interactions as sequences of anchors; compute dialogue flows by aligning the sequences of anchors representing the interactions of the clusters; compute the topic-specific dialogue tree from the dialogue flows, wherein: each node of the topic-specific dialogue tree corresponds to an anchor, and each edge of the topic-specific dialogue tree connects a first node of the topic-specific dialogue tree to a second node of the topic-specific dialogue tree, and the edge corresponds to a plurality of keyphrases characterizing the customer phrases appearing, in the transcripts, in response to the first party phrases of the anchor corresponding to the first node and the first party phrases of the anchor corresponding to the second node are in response to the second party phrases of the edge; and modify the topic-specific dialogue tree to generate a deterministic dialogue tree.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
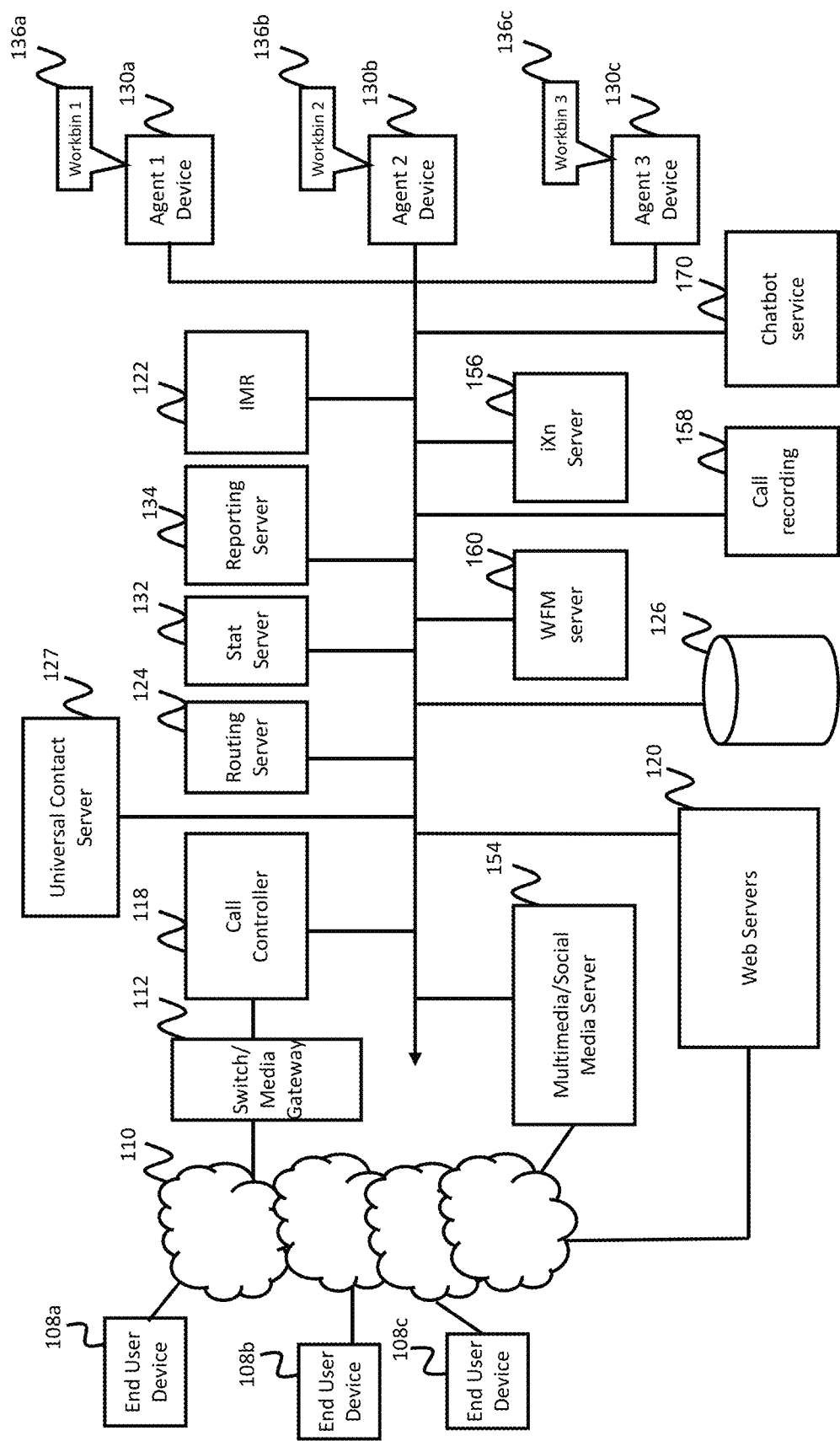
FIG. 1 is a schematic block diagram of a system for supporting a contact center in providing contact center services according to one exemplary embodiment of the invention.

Aspects of embodiments of the present invention are directed to systems and methods for automatically or semi-automatically generating chatbots. One field of application of chatbots is in the field of contact centers of enterprises. Customers or other outside entities who interact with enterprises frequently require service from the enterprises, such as asking questions about products or services, retrieving information about their accounts, modifying account settings, and the like. (The term "customer" will be used herein to generally refer to a third party entity, such as a human or another chatbot, that is communicating with the contact center.) Typically, human agents of the contact center (e.g., human agents on behalf of the enterprise) respond to customer inquiries. In some instances, chatbots can replace human agents by automatically providing answers to frequently asked questions. For example, some chatbots scan for keywords in the message received from the customer to identify a most likely response. Other chatbots may utilize more sophisticated natural language processing (NLP) techniques to, for example, analyze the semantics of the customer's message and to infer the topic that the customer wishes to discuss.

Chatbots may generally be classified by their flow of interaction with the user. For example, some chatbots are based on a concept similar to that of interactive voice response (IVR) systems. These systems typically used a graph-based control, where the current state of the interaction is represented, in part, by a node in the graph (e.g., a dialogue tree). When a new message is received from the customer (e.g., pressing a particular key on the keypad or speaking a particular word), the IVR system selects a next node in the graph in accordance with the new message. Applying NLP techniques to IVR systems can improve the customer experience, because the customer can provide inputs using free-form speech, and the IVR system can often automatically infer the user's intent based on the speech.

Another type of chatbot is based on a "form-filling" technique. Given a free-form customer input, the chatbot extracts all of the relevant values from that input and uses the extracted values to automatically fill in a form. For example, various fields of the form may expect data of a particular format, such as a ten digit number in the case of telephone numbers in the United States and standard formats for mailing addresses. After filling in the fields, if there are any incomplete fields, the chatbot may request that the user provide information to complete the missing parts of the form.

Creating chatbots that provide a good user experience for customers can be a challenging task, due, in part, to the wide variety of ways in which people communicate and due to the frequently non-linear flow of human conversation. Furthermore, chatbots in contact centers are typically customized to the particular business needs of the enterprises that they serve. For example, a chatbot for an electronics company would need to be able to answer questions about the product line of that electronics company and be able to provide solutions to common problems encountered by users of those electronics. As another example a chatbot for a utility company may need to be able to retrieve a particular customer's billing information and to accept payment of bills. Configuring the chatbot to cover (e.g., generate relevant responses in) the wide range of topics of conversation encountered within a particular contact center and to be able to respond to all the possible conversation paths for each topic would typically involve extensive manual (e.g., human) review and analysis of past conversations.

In more detail, customizing a chatbot may include four parts: part 1) deducing the space of topics discussed in the contact center of the enterprise based on the sample dialogue data; part 2) discovering the various dialogue flows in each of the topics (including the various customer replies, different phrasings or word choice among agents, different agent behaviors, and the progress of similar conversations along different directions); part 3) finding the main input and output entities in each dialogue topic (e.g., receiving as "input" from the customer: account numbers, payment information, mailing address, and the like, and sending as "output" from the agent of the contact center: dates, prices, ticket numbers, tracking numbers, and the like); and part 4) specifying a chatbot based on the information extracted in parts 1-3.

Generally parts 1-4 are all performed manually by a chatbot designer and parts 1-3 may be especially labor intensive.

As such, aspects of embodiments of the present invention are directed to systems and methods for automatically or semi-automatically generating chatbots based on sample dialogue data. One aspect of embodiments of the present invention relates to performing the data extraction of parts 1-3 automatically or semi-automatically with human guidance, thereby reducing or eliminating the human work required to configure a chatbot for a particular setting. This, in turn, reduces the time and cost of configuring a chatbot for the particular needs of a contact center, thereby increasing the efficiency of the operation of the contact center.

Embodiments of the present invention also improve the topical coverage of a resulting configured chatbot compared to manually configured chatbots. This is because embodiments of the present invention can include larger amounts of sample dialogue data (e.g., thousands to tens of thousands of sample dialogue data or more) whereas a human chatbot designer would only be able to consider a comparatively smaller sampling of a few of chat transcripts (e.g., a few hundred chat transcripts). Including a larger number of chat transcripts allows the resulting chatbot to be configured to handle some of the less frequently encountered topics as well as less frequent dialogue paths.

The sample dialogue data may include transcripts of previous chat conversations between customers and human agents of the contact center, thereby allowing embodiments of the present invention to, in the automatic case, automatically generate chatbots that reflect the variety of interactions encountered by the contact center of the enterprise or, in the semi-automatic case, to automatically generate customized suggestions and templates for use by human systems administrators (or chatbot designers) to use when configuring the chatbot. Systems and methods for generating chatbots in this way are described in more detail below.

According to some embodiments of the present invention, the automatically generated or semi-automatically generated custom chatbots are deployed in a contact center. In some embodiments, the chatbots automatically respond to customer inquiries. In other embodiments, the chatbots augment human agents by providing the human agents with automatically generated responses to the customer inquiries. The human agents can then approve the automatically generated responses to send the responses to the customer or edit the generated responses before sending the responses. Systems and methods for using these chatbots are described in more detail below.

Contact Center Overview

FIG. 1 is a schematic block diagram of a system for supporting a contact center in providing contact center services according to one exemplary embodiment of the invention. The contact center may be an in-house facility to a business or enterprise for serving the enterprise in performing the functions of sales and service relative to the products and services available through the enterprise. In another aspect, the contact center may be operated by a third-party service provider. According to some embodiments, the contact center may operate as a hybrid system in which some components of the contact center system are hosted at the contact center premise and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one example embodiment, the contact center system manages resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end users) desiring to receive services from the contact center may initiate inbound communications (e.g., telephony calls) to the contact center via their end user devices 108a-108c (collectively referenced as 108). Each of the end user devices 108 may be a communication device conventional in the art, such as, for example, a telephone, wireless phone, smart phone, personal computer, electronic tablet, and/or the like. Users operating the end user devices 108 may initiate, manage, and respond to telephone calls, emails, chats, text messaging, web-browsing sessions, and other multi-media transactions.

Inbound and outbound communications from and to the end user devices 108 may traverse a telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, or any wireless network/technology conventional in the art, including but to limited to 3G, 4G, LTE, and the like.

According to one example embodiment, the contact center system includes a switch/media gateway 112 coupled to the communications network 110 for receiving and transmitting telephony calls between end users and the contact center. The switch/media gateway 112 may include a telephony switch or communication switch configured to function as a central switch for agent level routing within the center. The switch may be a hardware switching system or a soft switch implemented via software. For example, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In one embodiment, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server 122 may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by a routing server 124 to route the call or communication to an appropriate contact center resource.

If the communication is to be routed to an agent, the call controller 118 interacts with the routing server (also referred to as an orchestration server) 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be, for example, Cassandra or any NoSQL database, and may be stored in a mass storage device 126. The database may also be a SQL database and may be managed by any database management system such as, for example, Oracle, IBM DB2, Microsoft SQL server, Microsoft Access, PostgreSQL, MySQL, FoxPro, and SQLite. The routing server 124 may query the customer information from the customer database via an ANI or any other information collected by the IMR server 122.

Once an appropriate agent is identified as being available to handle a communication, a connection may be made between the customer and an agent device 130a-130c (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108 and/or web servers 120. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events. In some embodiments of the present invention, the automatically generated chatbots interact with customers and agents through an application programming interface (API) associated with the multimedia/social media server 154.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system, the web servers may also be provided by third parties and/or maintained outside of the contact center premise. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like. In some embodiments of the present invention, the automatically generated chatbots interact with customers and agents through an application programming interface (API) associated with the web servers (e.g., through the web chat provided by the web servers 120).

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 126 or elsewhere. The mass storage device may take form of a hard disk or disk array as is conventional in the art.

According to some embodiments, the contact center system may include a universal contact server (UCS) 127, configured to retrieve information stored in the CRM database and direct information to be stored in the CRM database. The UCS 127 may also be configured to facilitate maintaining a history of customers' preferences and interaction history, and to capture and store data regarding comments from agents, customer communication history, and the like.

The contact center system may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

The contact center system may also include a call recording server 158 configured to record interactions, including voice calls, text chats, emails, and the like. The recorded interactions may be stored in the mass storage device 126, in addition to other types of data. In some embodiments, the mass storage device includes multiple storage devices (e.g., multiple hard drives or solid state drives). In some embodiments of the present invention, the mass storage device 126 is abstracted as a data storage service, which may be a cloud based service such as Amazon Simple Storage Service (S3) or Google Cloud Storage.

The contact center system may also include a workforce management server 160, which is configured to manage the agents of a contact center, including setting the work schedules of the agents of the contact center in accordance with predicted demand (e.g., predicted numbers of incoming and outgoing interactions with the contact center across the different media types), in accordance with agent vacation plans, break times, and the like. The schedules generated by the workforce management server may also account for time spent by agents and supervisors in meetings, group or individual training sessions, coaching sessions, and the like. Taking into account the various demands on an agent's time and a supervisor's time during the work day can be used to ensure that there are sufficient agents available to handle the interactions workload.

Figure 2:
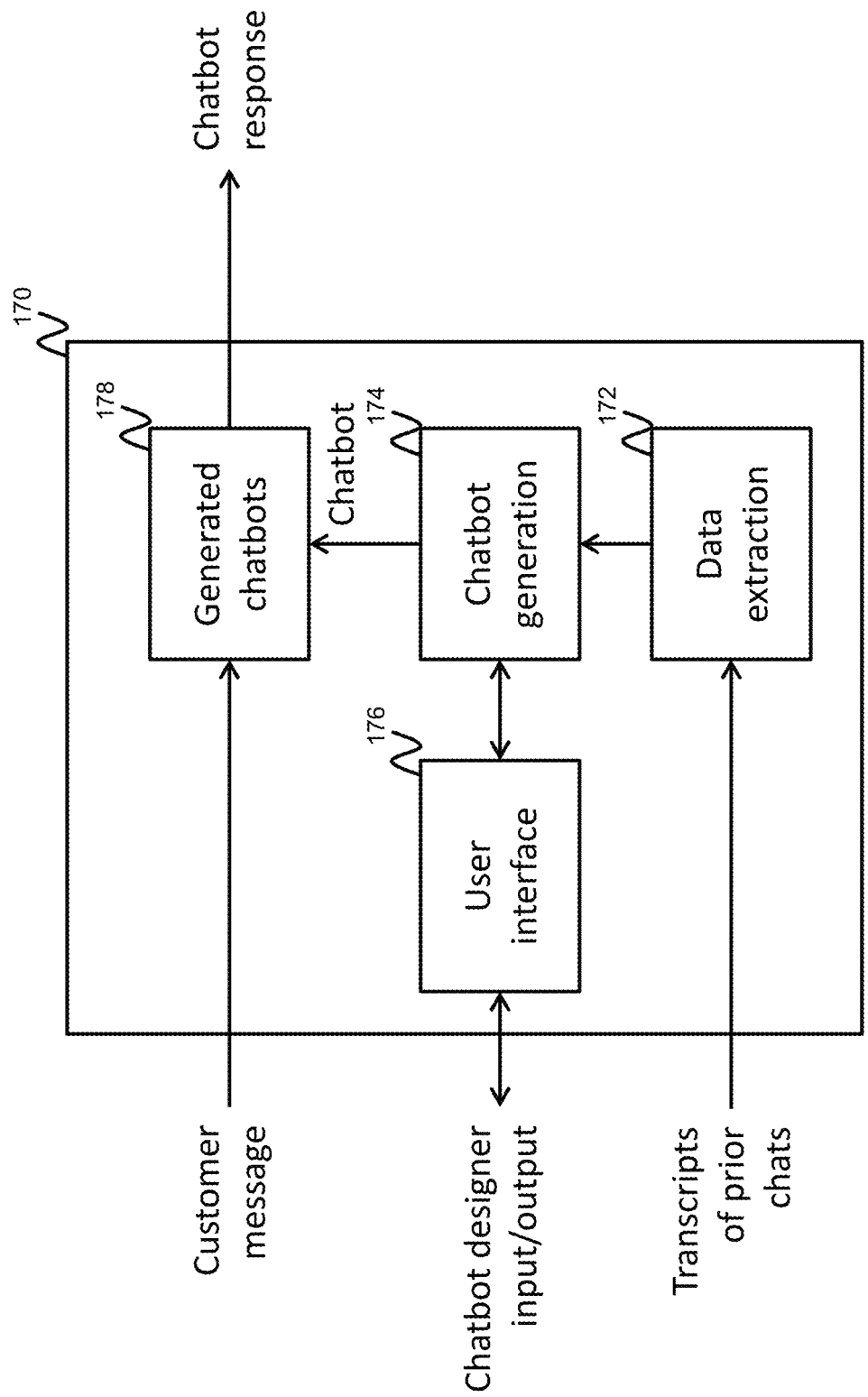
FIG. 2 is a block diagram illustrating a chatbot service 170 according to one embodiment of the present invention.

The contact center system may further include a chatbot service server 170 configured to provide chatbot services to the contact center. FIG. 2 is a block diagram illustrating a chatbot service 170 according to one embodiment of the present invention. The chatbot service server may include a data extraction module 172 configured to extract information from transcripts of prior chat interactions (e.g., stored in the mass storage device 126 and/or the call recording server 158). The extracted data may be provided to a chatbot generation module 174, which is configured to generate a chatbot from the extracted data. The chatbot service server 170 may provide a user interface 176 for human supervisors or designers to control the configuration of the chatbots generated by the chatbot generation module 174, such as by displaying one or more suggestions extracted by the data extraction module 172, allowing the human designer to approve, reject, or edit the suggestions, and to control the final generation of the chatbot. The generated chatbot can then be stored in a collection of chatbots 178. During runtime, customer messages are presented to the generated chatbots 178, which generate responses to the customer messages. Functions and methods performed by the chatbot service server 170 will be described in more detail below.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms "interaction" and "communication" are used interchangeably, and generally refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Chatbot Generation

Aspects of embodiments of the present invention are directed to systems and methods for automatically or semi-automatically generating chatbots from sample dialogue data. In the context of chatbot generation, the term "automatic" will be used to refer to a process by which a systems and methods according to embodiments of the present invention generate chatbots with substantially no input from a system administrator (e.g., a human) involved in generating a chatbot. In contrast, the term "semi-automatic" will be used herein to refer to systems and methods where embodiments of the present invention generate recommendations and proposals based on the training data, where the recommendations and proposals are presented to the system administrator for analysis and inclusion or exclusion of the recommendations and proposals in the resulting chatbot.

The sample dialogue data may include transcripts of chat conversations between customers and human agents of the contact center of the enterprise. In some embodiments, where such transcripts may not be available, generic training data collected from other enterprises and redacted (e.g., to remove enterprise-specific information) may be used as the sample dialogue data. For the sake of convenience, the term "training data" will be used to refer to data that is used to generate the chatbots, where the data includes the sample dialogue data.

Figure 3:
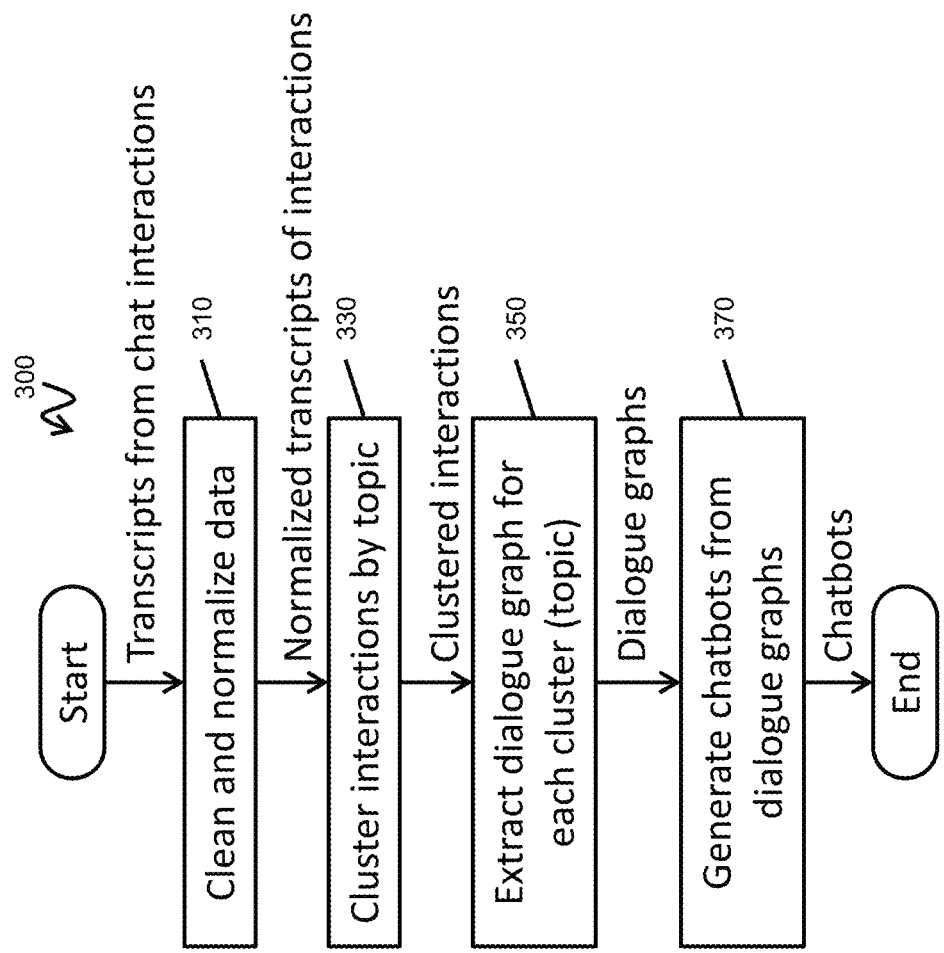
FIG. 3 is a flowchart illustrating a method for generating a chatbot according to one embodiment of the present invention.

FIG. 3 is a flowchart illustrating a method for generating a chatbot according to one embodiment of the present invention. In operation 310, the sample dialogue data, such as the transcripts from the chat interactions, are cleaned and normalized by the data extraction module 172. In operation 330, the interactions are clustered by topic using their normalized transcripts. In operation 350, a dialogue graph is automatically extracted for each cluster of interactions. In other words, a dialogue graph is generated for each topic, where the paths through the dialogue graph represent different types of conversation paths. In operation 370, the chatbot generation module 174 generates a chatbot based on the extracted dialogue graph. In embodiments using a semi-automatic approach, a system administrator or designer uses the user interface 176 to review and edit suggestions provided by the chatbot generation module 174 in the process of generating the chatbot.

"is there anything else I can help you with today?" or customer utterances such as "Can you help me with another issue?"

The cleaning and normalizing in operation 310 may further include preprocessing the descriptions and bodies of the interactions. The preprocessing may include: standardizing abbreviations (e.g., expanding abbreviations to non-abbreviated forms, such as "you'll" to "you will") and standardizing spelling variations (e.g., "log-in" to "login" and "user name" to "username"). The preprocessing may also include named entity recognition (NER) which uses pattern matching, such as regular expressions, to identify dates, times periods, prices, usernames, passwords, and the like. These diverse data can then be replaced by a token representing that data. In some embodiments, the named entity recognition can be performed using a generic, pre-trained NER tool or a neural network can be trained based on sample annotated data (see, e.g., Chiu, Jason PC, and Eric Nichols. "Named entity recognition with bidirectional LST™-CNNs." arXiv preprint arXiv:1511.08308 (2015)). Table 1 provides examples of utterances before and after cleaning:

TABLE 1

| Sentence | Cleaned sentence |
| --- | --- |
| the early termination fees would be 300$ | the early termination fees would be <PRICE> |
| I am showing that your username is john5 and I reset your password to a#4q9! | I am showing that your username is <USERNAME> and I reset your password to <PASSWORD> |
| If I could offer you 5gb's for free for the next six months and $10 off for 12 months would you maybe reconsider disconnecting your services? | If I could offer you <SPEED> for free for <PERIOD> and <PRICE> off for <PERIOD> would you maybe reconsider disconnecting your services? |

Extracting Data from Training Data

In operation 310, the data extraction module 172 cleans and normalizes the sample dialogue data.

According to one embodiment, as part of the cleaning and normalizing of the transcripts, the data extraction module 172 extracts a "description" and a "body" from each interaction in the sample dialogue data. The opening sentences or first messages from a customer during an interaction are typically uttered in response to a question that asks for the reason for the interaction. As such, the motivation or "intent" of the customer is typically captured in the opening phrase and therefore these opening messages can provide a strong indication of the topic of the interaction and may therefore be used as the description of the interaction. The remainder of the interaction, which includes alternating utterances of the agent and the customer, will be referred to as the body of the interaction.

In some circumstances, a single interaction may involve multiple topics. For example, a customer may initiate a chat interaction to ask about an upgrade availability date, and then transition the interaction to discuss adding a user to an account. For the sake of convenience, it will be assumed below that each interaction in the sample dialogue data involves only a single topic. In some embodiments, in order to achieve the assumption that each interaction involves only a single topic, transcripts of interactions that contain multiple topics are automatically separated into multiple interactions, each having a single topic. The transcript of the interaction containing multiple topics can be split at a phrases that indicate a transition between topics. These transitional phrases may include agent utterances such as:

According to some embodiments of the present invention, in operation 330, the sample dialogue data is clustered based on topic. In some embodiments, the clustering is based on the descriptions of the interactions (e.g., as described above, these descriptions may be the opening sentences or first messages from the customers). The descriptions are generally sufficient for understanding the intent of the customer, and clustering is directed toward grouping together interactions having similar descriptions.

According to one embodiment of the present invention, the similarity between two chat descriptions is based on their term overlap, weighted by the inverse document frequency (IDF) scores of the terms, after lemmatization (e.g., semantically grouping together the inflected forms of a word, such as grouping together "walk" and "walking" or and grouping together "better" and "good," but selectively grouping together forms of the word "meet" based on whether it is used as a verb such as "we met yesterday" or a noun such as "he ran a relay at the track meet"). According to one embodiment, the data extraction module 172 clusters the interactions using Y-clustering (see, e.g., U.S. Patent Application Pub. No. 2015/0032452, filed in the United States Patent and Trademark Office on Jul. 26, 2013, the entire disclosure of which is incorporated by reference herein and Ye, Hui, and Steve J. Young. "A clustering approach to semantic decoding." INTERSPEECH. 2006.) In some embodiments, the algorithm is configured to yield high confidence clusters (e.g., highly coherent clusters) at the expense of coverage of the data set (for example, as a result of using high confidence clusters, in some circumstances, only 5-10% of the interactions are grouped into a cluster).

Table 2, below, provides examples of chat descriptions that are clustered together using a technique according to one embodiment of the present invention, where the "cluster id" column identifies which cluster the interaction is a member of.

TABLE 2

| cluster id | chat description |
|---|---|
| 0 | when is my contract up |
| 0 | i am wanting to get a copy of my contract so i know when my contract is up. |
| 0 | i'd like to know when my contract is up |
| 0 | when is my contract up |
| 0 | i would like to know when my contract is up |
| 1 | when will my account be suspended |
| 1 | suspended account |
| 1 | why is my account suspended |
| 1 | account suspended thanks |
| 1 | i need to suspend service while i'm away. |
| 1 | suspended services |
| 1 | needing to know if my service has been suspended. |
| 2 | cancellation of service |
| 2 | service cancellation |
| 2 | cancellation |
| 2 | service cancellation |
| 3 | internet down |
| 3 | internet service is down |
| 3 | why is internet down |
| 3 | my internet is still down |
| 3 | internet is all but down |
| 3 | internet keeps going down |
| 3 | internet down since friday |
| 3 | my internet is down. |
| 3 | internet down again. |
| 3 | internet service has been down since last night. |
| 4 | i need help changing my payment method |
| 4 | i need to change my payment method |
| 4 | need to change payment method |
| 4 | how can i change my payment method |
| 4 | change payment method |
| 4 | i need help changing my payment method. |
| 4 | need to change my payment method and make a payment |
| 5 | i cant remember username or password |
| 5 | i am trying to look at my account and pay i cant remember my username or my password |
| 5 | i cant remember my username or password. the one i try says wrong username or password |
| 5 | cant remember my username or password |
| 5 | cant remember username or password said it was sent to email but haven't got anything |
| 5 | i cant remember my username or password to get into my account i would like to upgrade my service |

In some embodiments of the present invention, the user interface 176 displays the clusters and the descriptions of the interactions contained in the clusters (or examples of the interactions). Furthermore, some embodiments allow the chatbot designer to manually split a cluster into multiple clusters (e.g., by selecting which interactions should be members of the new cluster) or join separate clusters into a single cluster.

In some embodiments, the clustered conversations are automatically labeled by keyphrases, thereby assisting the chatbot designer in understanding the space of chat topics. In some embodiments, the automatically generated labels are displayed to the chatbot designer through the user interface 176, and the chatbot designer may edit the labels.

Figure 4A:
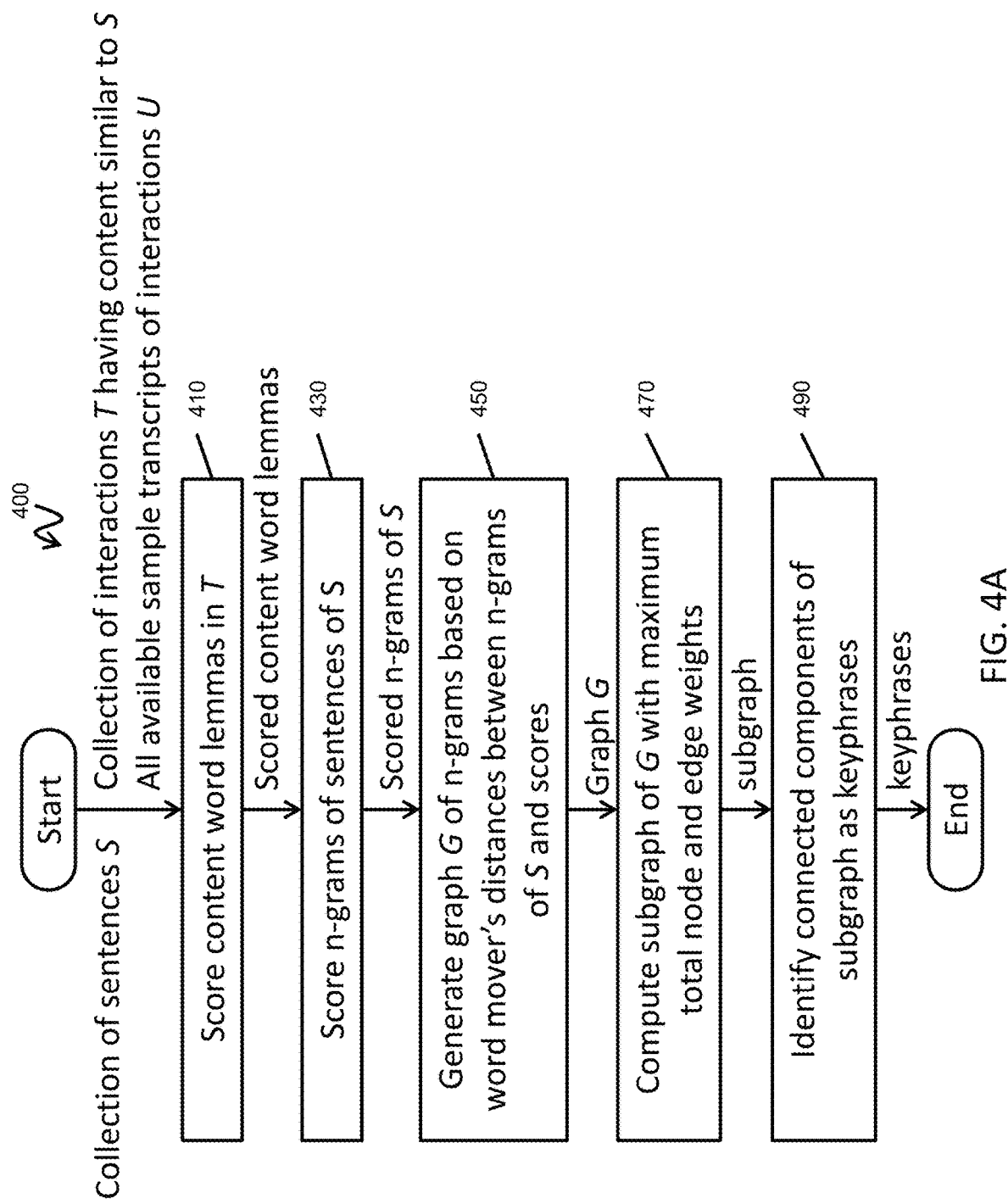
FIG. 4A is a flowchart of a method for computing cluster labels according to one embodiment of the present invention.

In one embodiment, the data extraction module 172 automatically computes a label for each cluster by applying a keyphrase extraction process to the descriptions of interactions in the cluster. FIG. 4A is a flowchart of a method for computing cluster labels based on a keyphrase extraction process according to one embodiment of the present invention.

Given a collection of sentences S (the descriptions of the interactions of the cluster to be labeled), a collection of sample transcripts of interactions T from a similar context as the sentences of S (where T refers to the full transcripts of the interactions of the cluster to be labeled), and all available sample transcripts of interactions U, the keyphrase extraction process finds key terms or phrases (n-grams) that repeat in similar semantic variations in many of the sentences in S (thereby separating the meaning of a sentence from the noise in the words). A candidate n-gram can be evaluated not only locally in the sentence that it appears in, but also globally based on its relationships with candidate n-grams from other sentences in the collection of sentences.

Parameters of the keyphrase extraction process include a maximum keyphrase length N (n-gram length which may be set to a value such as 5), a stop words list (e.g., list of words that are to be ignored), and a maximum word mover's distance (WMD_MAX, which may be set to a value such as 0.5). The word mover's distance will be described in more detail below.

Referring to FIG. 4A, in operation 410, all of the content word lemmas of T (e.g., the lemmatized words of T that are not in the stop words list, obtained by filtering all of the words of T to remove stop words, and lemmatizing the remaining words) are scored using a graph-based ranking algorithm (see, e.g., Kazi Saidul Hasan and Vincent Ng. Automatic Keyphrase Extraction: A Survey of the State of the Art. Proceedings of the 52nd Annual Meeting of the Association for Computational Linguistics (ACL), 2014). Generally graph-based ranking algorithms represent sets of documents as a weighted undirected graph whose nodes correspond to words and whose edges represent co-occurrence relations within some distance. According to one embodiment of the present invention, the edges are weighted by the strength of the co-occurrence, measured using a dice coefficient formula (see, e.g., R. Wang, W. Liu and C. McDonald. Corpus-independent generic keyphrase extraction using word embedding vectors. Software Engineering Research Conference, 2014). In addition, term frequency-inverse document frequency (TF-IDF) scores are calculated for each content word lemma of T (term frequency in T, inverse document frequency in U), and the data extraction module 172 computes a score for each node in the graph using, for example, a network propagation algorithm (e.g., a PageRank algorithm, see, e.g., Page, Lawrence, et al. The PageRank citation ranking: Bringing order to the web. Stanford InfoLab, 1999). The importance score for a word w will be given by r(w).

Figure 4B:
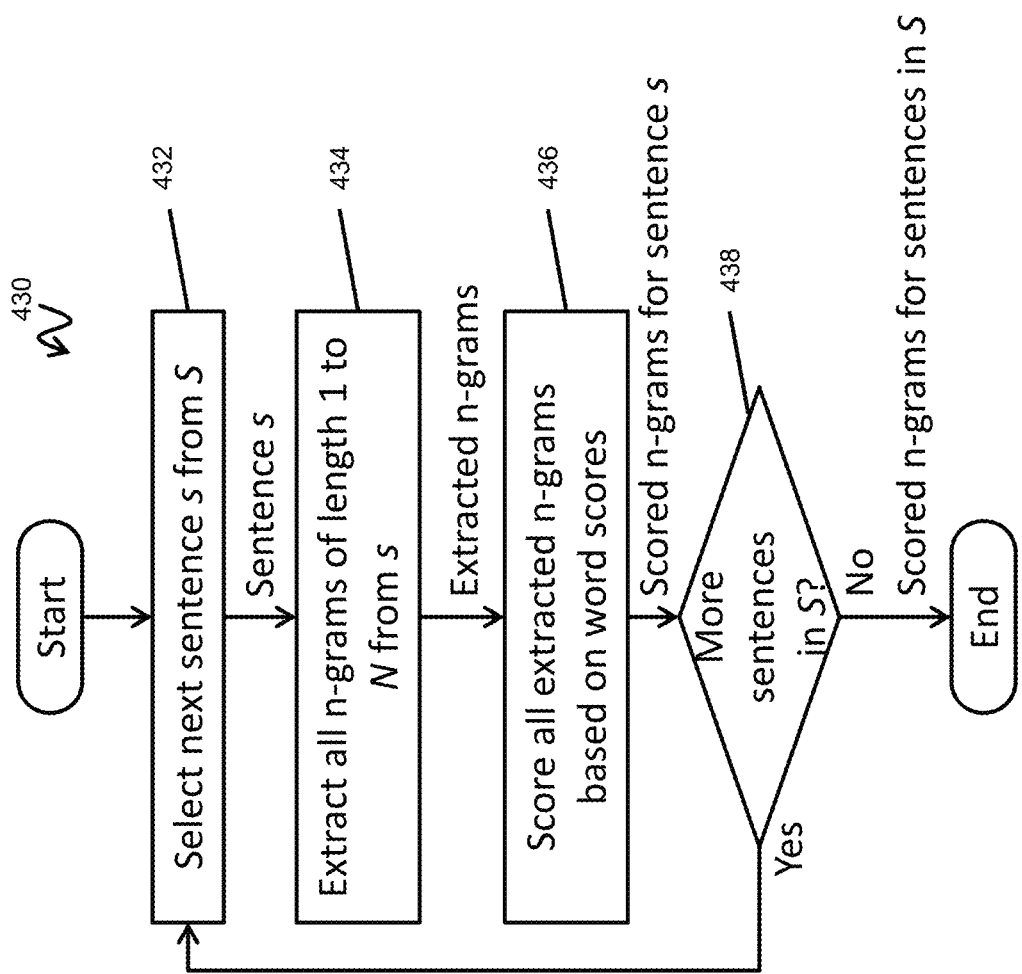
FIG. 4B is a flowchart of a method for scoring sentences according to one embodiment of the present invention.

In operation 430, the data extraction module 172 scores n-grams of all of the sentences in S. FIG. 4B is a flowchart of a method 430 for scoring sentences according to one embodiment of the present invention. In operation 432, the data extraction module 172 selects a next sentence s from the collection of sentences S. In operation 434, the data extraction module 172 extracts all possible n-grams of length 1 to length N from s that (i) do not start or end with a stop word, (ii) do not end with a modal part of speech (POS) tag, and (iii) contain at least one content word. As noted above, N is a parameter that sets the maximum length of a keyphrase to be extracted through this process.

In operation 436, the data extraction module 172 scores each n-gram based on the scores of the words in the n-grams (where the scores were computed in operation 410). In more detail, the number of content words in an n-gram p will be denoted as cw(p). The score of an n-gram p is computed by the formula:

$$\sum_{w \in p} r(w) * \log(cw(p) + 1)$$

Qualitatively, the importance of an n-gram p is based on the importance scores r(w) of its constituent words w and on its length cw(p); longer n-grams are rewarded in order to gain more context.

In operation 438, the data extraction module 172 determines whether there are more sentences in S. If so, then the process returns to operation 432 to select the next sentence for scoring. If not, then the scored n-grams for the sentences in S are output and the process continues with operation 450.

Returning to FIG. 4A, in operation 450 the data extraction module 172 generates a graph G of the n-grams based on semantic distances between the n-grams of S. According to one embodiment, the semantic distances are calculated based on word mover's distances (WMD).

The word mover's distance (WMD) is a measure of distance between two text documents. See, for example, Matt J. Kusner, Yu Sun, Nicholas I. Kolkin and Kilian Q. Weinberger. From word embeddings to document distances. Proceedings of the 32nd International Conference on Machine Learning (ICML), 2015. The WMD function treats the input documents (e.g., n-grams) as word histograms reflecting the word distributions in a bag-of-words representation. The WMD is defined as the minimum cumulative cost required to move all the words in one histogram to another, weighted by the semantic similarity between word pairs measured using, for example, word2vec (see, e.g., T. Mikolov, I. Sutskever, K. Chen, G. Corrado and J. Dean. Distributed representations of words and phrases and their compositionality. NIPS, 2013). In one embodiment of the present invention, the WMD is calculated using normalized word histograms that are based on the word frequencies in each sentence combined with the IDF scores of the words.

Figure 4C:
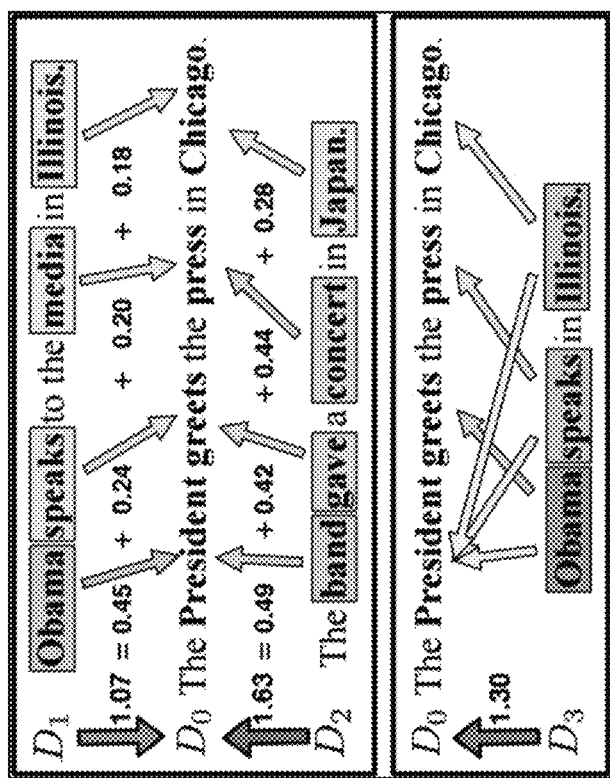
FIG. 4C shows examples of word mover's distances calculated between various sentences according to one embodiment of the present invention.

FIG. 4C shows examples of word mover's distances calculated between various sentences according to one embodiment of the present invention. In particular, distances are calculated between a sentence $D_0$ ("The President greets the press in Chicago.") and various example sentences: $D_1$ ("Obama speaks to the media in Illinois."); $D_2$ ("The band gave a concert in Japan."); and $D_3$ ("Obama speaks in Illinois."). The algorithm identifies corresponding words of the sentences and measures semantic similarity between the corresponding words. For example, when computing a distance between $D_0$ and $D_1$, the word "President" is matched with "Obama", the word "greets" is matched with "speaks", the word "press" is matched with "media", and the word "Chicago" is matched with "Illinois." as noted above, the semantic similarity of each of these four pairs of words is computed, and the sum of these semantic similarities gives a total. As seen in FIG. 4C, the WMD between $D_0$ and $D_1$ is smaller than the WMD between $D_0$ and $D_2$, which is consistent with the idea "Obama speaks to the media in Illinois" is more similar to "The President greets the press in Chicago" than "The band gave a concert in Japan."

Returning to operation 450, for each n-gram p extracted from a sentence s, the data extraction module 172 defines a node (p, s). For each pair of nodes $(p_1, s_1)$ and $(p_2, s_2)$ from different sentences ($s_1$ and $s_2$), compute the semantic distance (e.g., word mover's distance) between the corresponding lemmatized n-grams $p_1$ and $p_2$. If the semantic distance is below a threshold (e.g., a maximum word mover's distance or WMD_MAX), then the data extraction module 172 adds an edge $y_e$ between $(p_1, s_1)$ and $(p_2, s_2)$ where the weight of the edge $(w(y_e))$ is given by:

$$w(y_e) = (1 - \text{semantic distance}) * \text{length}(p_1) * \text{length}(p_2)$$

This weight reflects the semantic similarity between the n-grams $p_1$ and $p_2$, and connections between longer n-grams having higher weight due to the multiplication by the lengths of the n-grams. This strengthens similarities such as between "lower bill" and "reduce bill" at the expense of the higher similarity between "bill" and itself, resulting in more context in the selected keyphrases.

Figure 4D:
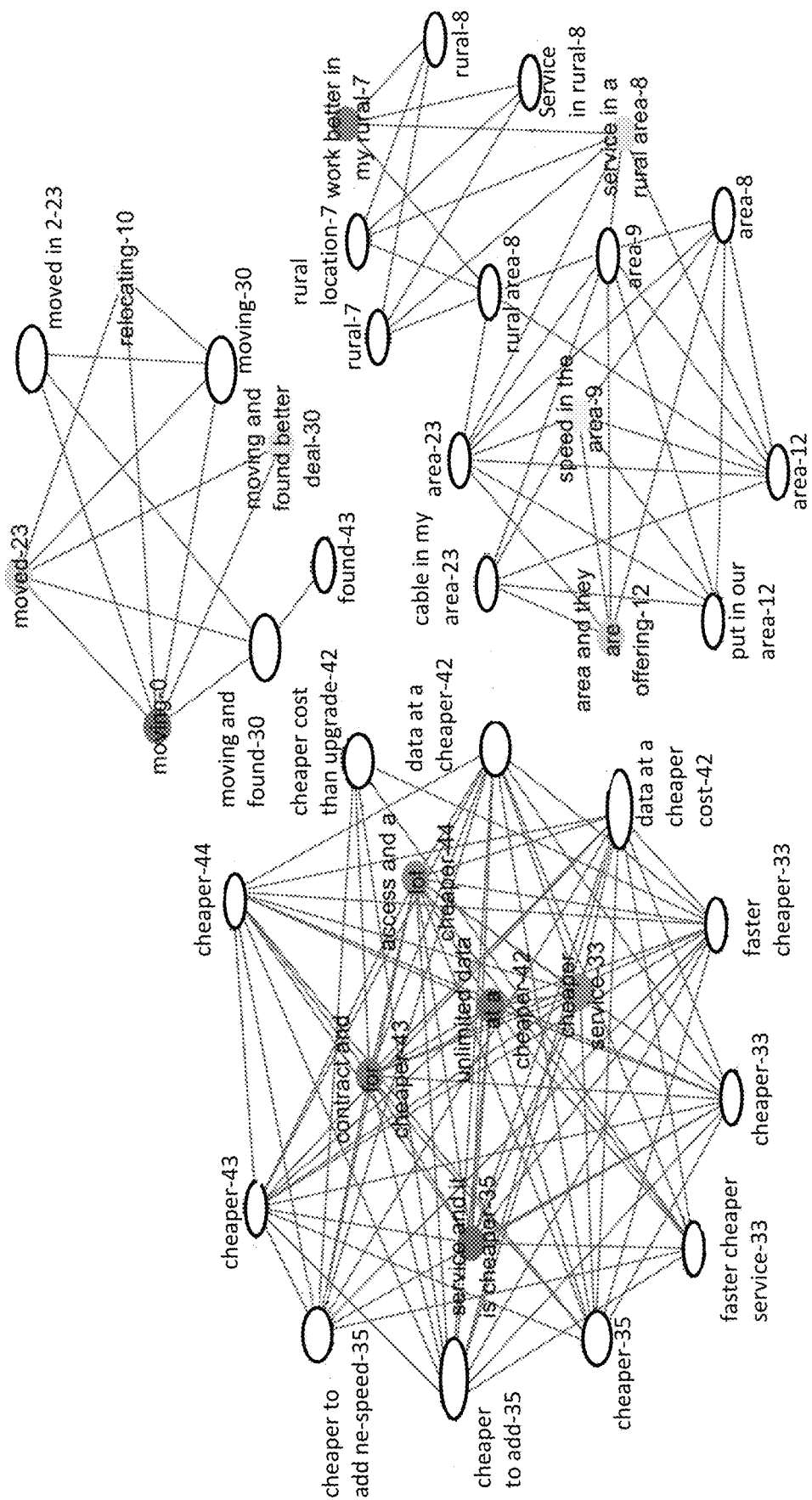
FIG. 4D is an example of a graph of n-grams according to one embodiment of the present invention.

In operation 470, the data extraction module 172 computes a subgraph of G having maximum total node and edge weights, subject to a constraint that at most one n-gram can be selected from each sentence. In one embodiment, this is expressed that, if $u=(p_1, s_1)$ and $v=(p_2, v_2)$ are nodes in the graph and $s_1=s_2$, then at most one of u and v can be selected. The computation of this subgraph of G can be formulated as an integer linear programming (ILP) problem and solved using an ILP solver or ILP optimizer (e.g., one available in the GNU Linear Programming Kit or GLPK). FIG. 4D is an example of a graph of n-grams according to one embodiment of the present invention.

According to one embodiment of the present invention, the integer linear programming problem can be formulated as follows. Given the graph G=(V,E) reflecting the n-grams (or nodes V) and the relations (or edges E) between them, and a weight function w for the nodes and edges, and a collection (e.g. set) of sentences S, where each node in the graph G (e.g., each n-gram) belongs to a single sentence of the collection of sentences, define two variable types: $x_i=1$ if the i-th node is in the optimal subgraph, $x_i=0$ otherwise; and $y_e=1$ if both endpoints of edge e are taken for the optimal subgraph and $y_e=0$ otherwise. In one embodiment, the ILP solves optimizes an objective function that is the sum of the node weights ($w(x_i)$) and edge weights ($w(y_e)$) in the resulting subgraph:

$$\max \sum_i x_i w(x_i) + \sum_e y_e w(y_e)$$

In more detail, the ILP solver finds an assignment to all variables $x_i$, $y_e$ (e.g., including or excluding particular nodes and edges) that maximizes the objective function in the resulting subgraph. The weights of the nodes correspond to the scores calculated for those nodes in operation 430 (e.g., $w(x_i)$ is the score of node $x_i$), and the weights of the edges as described above (see the discussion of edge weights $w(y_e)$, above). The ILP solver maximizes the objective function subject to the constraints that:

$$\forall (u,v) \in E, y_{(u,v)} \leq x_u, x_v$$

$$\forall (u,v) \in E, y_{(u,v)} \geq x_u + x_v - 1$$

which ensures that an edge is included in the optimization sum if and only if both of its endpoints (denoted u and v) are selected in the current subgraph being evaluated, and subject to the constraint:

$$\forall \text{ sent} \in S, \sum_{i \in sent} x_i \leq 1$$

which ensures that at most one n-gram is selected from each sentence.

In operation 490, the data extraction module 172 finds the connected components of the subgraph extracted in operation 470. These connected components are the keyphrases selected from each sentence along with their relations to keyphrases from other sentences. In one embodiment, the data extraction module 172 filters out nodes that are not connected to other nodes, keeping only the nodes that are connected to other nodes. The remaining keyphrases in each connected component may be arranged in the form of a histogram, in accordance with length.

According to one embodiment of the present invention, the label of a cluster is set as the longest keyphrase having the most frequent base form, where "base form" of a keyphrase refers to a bag of words representation after of the keyphrase with the stop words are removed and after applying stemming to the remaining words. For example, all of the keyphrases having the same longest length are considered, and the keyphrase among those keyphrases having the most frequent base form is selected as the label.

Table 3 illustrates some automatically computed labels for the clusters shown in Table 2, above, along with manual labels that were generated by a human system administrator or chatbot designer.

TABLE 3

| cluster id | manual label | computed label |
| --- | --- | --- |
| 0 | contract end date | contract is up |
| 1 | suspended account | account be suspended |
| 2 | cancellation of service | cancellation |
| 3 | internet availability problem | internet down |
| 4 | payment method change | changing my method of payment |
| 5 | password reset | remember my username or password |

In some embodiments of the present invention, the user interface 176 displays the automatically generated labels and allows the chatbot designer to modify the labels (e.g., to generate the manual labels shown in Table 3).

In some embodiments of the present invention, an alternative cluster labeling technique based on part of speech (POS) roles is used instead. This alternative cluster labeling technique is described in U.S. Patent App. Pub. No. 2016/0012818 "System and method for semantically exploring concepts," filed in the United States Patent and Trademark Office on Jul. 9, 2014, the entire disclosure of which is incorporated by reference herein.

In some instances, some of the detected clusters may represent the same topics. For example, the topic "forgot username and password" and the topic "cannot remember credentials" are different wordings for the same intent. Therefore, according to one aspect of embodiments of the present invention, a statistical technique is applied to selectively join the clusters. In some embodiments, the joining of the clusters is based on the full chat content of the clusters (e.g., not only the descriptions of the interactions, but also the bodies of the interactions).

Figure 4E:
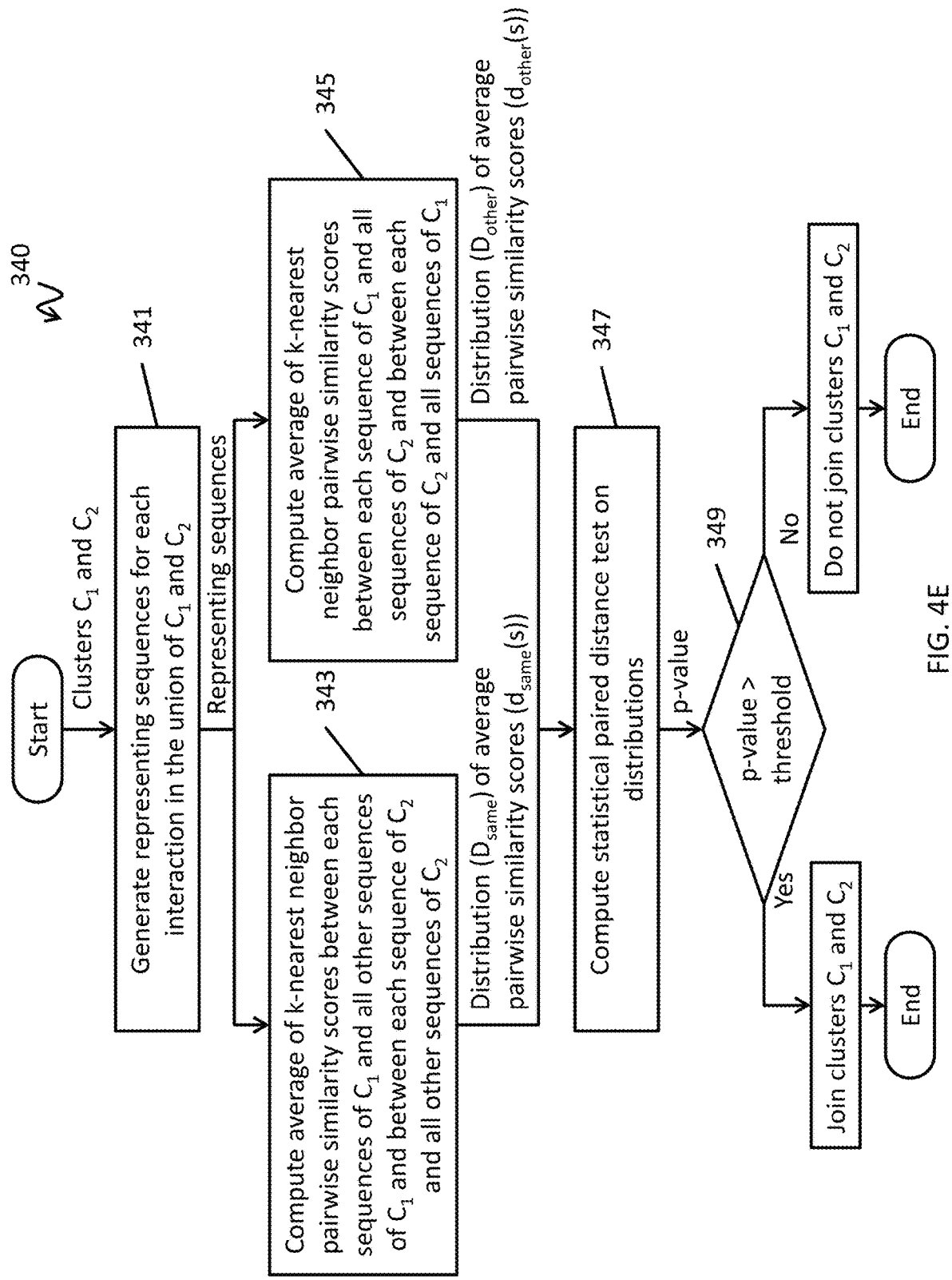
FIG. 4E illustrates a method for determining whether or not to join two given clusters, $C_1$ and $C_2$, in accordance with one embodiment of the present invention.

FIG. 4E illustrates a method 340 for determining whether or not to join two given clusters, $C_1$ and $C_2$, in accordance with one embodiment of the present invention. In operation 341, the data extraction module 172 finds anchors of the set of interactions formed by the union of clusters $C_1$ and $C_2$ (e.g., $C_1 \cup C_2$), and generates a representative sequence for each chat (for example, the anchors may be based on repetitive similar phrases that are observed in the clusters, as described in more detail with respect to operations 354 in FIG. 6). In operation 343, for each sequence (or sentence) s in cluster $C_1$, the data extraction module 172 computes a pairwise similarity score (e.g., the sum of matches minus the sum of mismatches, insertions, and deletions in the sequences) to all other sequences of $C_1$. The data extraction module 172 uses these distances to compute an average distance $d_{same}(s)$ to the k nearest neighbors of s among these sequences (e.g., the distance between a sentence s and sentences of its own cluster). Similarly, this computation is done for the sequences in $C_2$. Joining the two lists of similarities gives the distribution $D_{same}$. In operation 345, the data extraction module 172 calculates, for every sequence s of $C_1$, a similarity score to every sequence that is in the other cluster $C_2$, and also computes an average distance to the k nearest neighbors in $C_2$; and vice versa—for every sequence in $C_2$ it computes the average distance to the k nearest neighbors in $C_1$. Joining these two similarity scores lists gives the distribution $D_{other}$.

As explained above, the data extraction module 172 organizes the computed average distances $d_{same}$ and dottier into two lists: $D_{same}$, which represents the distances between all sequences in $C_1$, $C_2$ to their own cluster; and $D_{other}$, which represents the distances between all sequences in $C_1$, $C_2$ to the other cluster (e.g., $D_{same}=[d_{same}(s)$ for each $s \in C_1]+[d_{same}$ (s) for each $s \in C_2]$ and $D_{other}=[d_{other}(s)$ for each $s \in C_1]+[d_{other}$ (s) for each $s \in C_2]$).

In operation 347, the data extraction module 172 runs a statistical paired difference test to compute a p-value that the distributions $D_{same}$ and $D_{other}$ are different from each other. If the p-value is smaller than a threshold value (e.g., 0.01), then, in operation 349, the data extraction module 172 determines that the clusters $C_1$ and $C_2$ represent different topics and therefore should not be joined, but if the p-value is greater than the threshold, then the two clusters can be joined. The determination of whether the clusters can be joined (because they refer to the same topic) can then be output.

Accordingly, in some embodiments of the present invention iterate over all pairings of the clusters computed in operation 330 and apply the above method to determine whether those clusters can be joined, and then join clusters where the p-value is greater than the threshold.

Figure 4F:
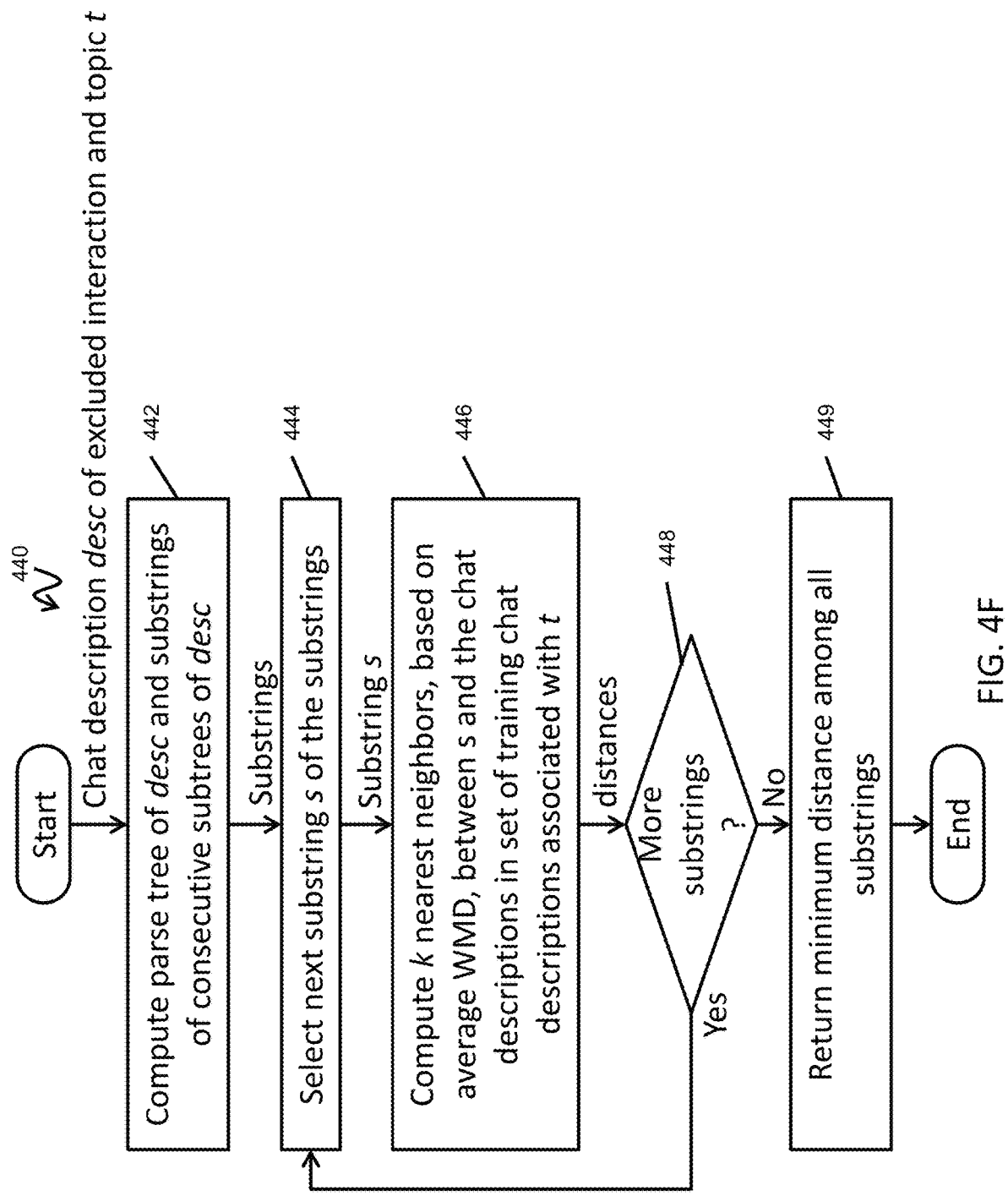
FIG. 4F is a flowchart of a method for computing affiliation according to one embodiment of the present invention.

To increase the coverage of chats per topic and thus improve the dialog learning, in some embodiments of the present invention, all the chat descriptions that were not included in any of the clusters (e.g., due to too high a distance from other descriptions), referred to herein as excluded interactions, are evaluated for addition to an existing cluster. In one embodiment of the present invention, the data extraction module 172 evaluates the affiliation of at least one (or possibly each of) these excluded interactions or chat descriptions to each of the labeled topics. FIG. 4F is a flowchart of a method for computing affiliation according to one embodiment of the present invention. If the computed affiliation score satisfies (e.g., is greater than) a threshold score, then the chat is assigned to that topic.

Figure 4G:
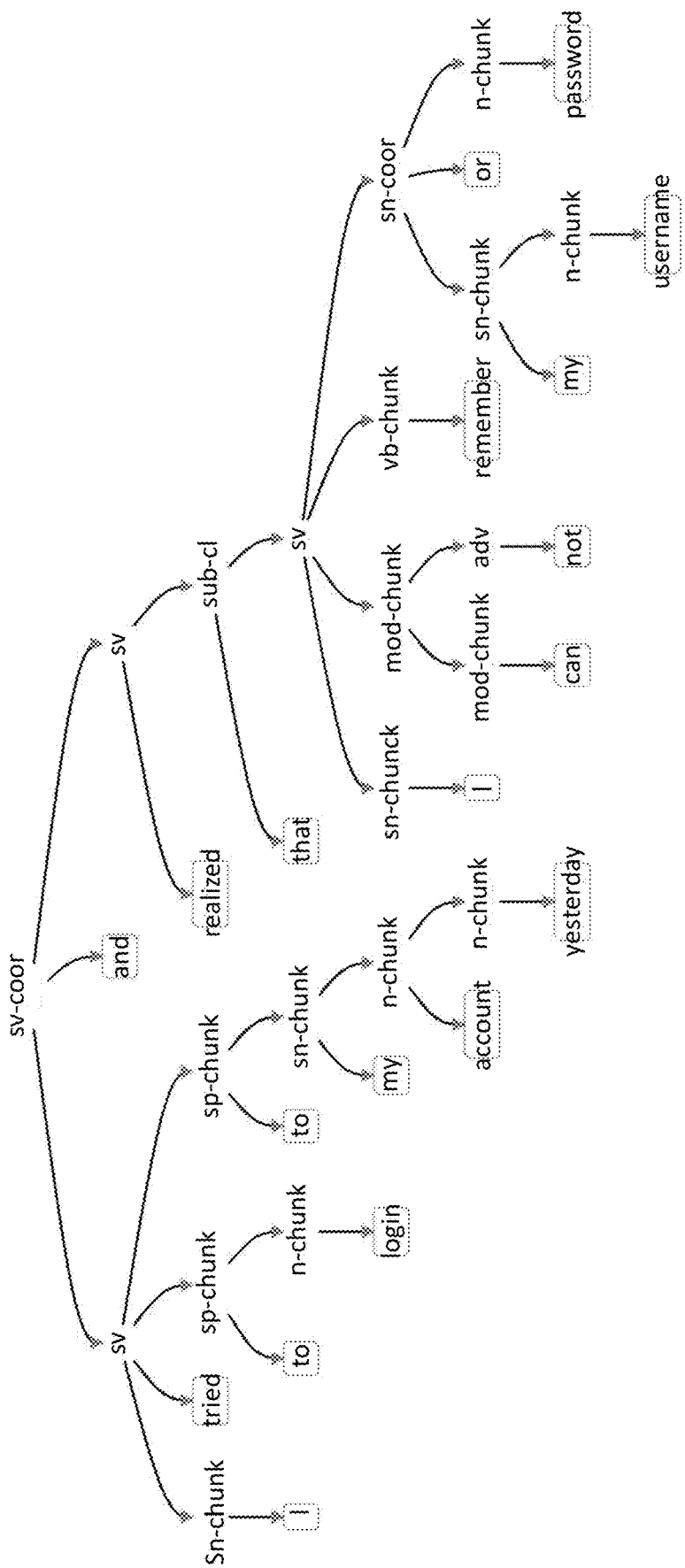
FIG. 4G is an example of a parse tree according to one embodiment of the present invention.

Referring to FIG. 4F, to compute an affiliation score between a description desc and a topic t in operation 442, the data extraction module 172 computes a parse tree of desc (e.g., using the techniques described in Xavier Carreras, Isaac Chao, Lluís Padró and Muntsa Padró. FreeLing: An open-source suite of language analyzers. Proceedings of the 4th International Conference on Language Resources and Evaluation (LREC), 2004 and in Jordi Atserias, Bernardino Casas, Elisabet Comelles, Meritxell Gonzalez, Lluís Padró and Muntsa Padró. FreeLing 1.3: Syntactic and semantic services in an open-source NLP library. Proceedings of the Fifth International Conference on Language Resources and Evaluation (LREC), 2006) and generates all substrings of consecutive subtrees at the same level of the parse tree, denoted PTSTR(desc). FIG. 4G is an example of such a parse tree.

Referring to FIG. 4G, the example input string is "i tried to login to my account yesterday and realized that i can not remember my username or password". Given this input, the substrings of consecutive subtrees (PTSTR(desc)) will generate the substrings shown below in Table 4:

TABLE 4 i tried to login to my account yesterday and realized that i can not remember my username or password
to login
to login to my account yesterday
account yesterday
realized that i can not remember my username or password
can not
can not remember
can not remember my username or password
remember my username or password
my username
my username or password
or password In operation 444, the data extraction module 172 selects a next substring s of the substrings extracted in operation 442. In operation 446, the data extraction module 172 computes the WMD distances between the current substring s and each chat description in a collection of training chat descriptions that are associated with the current topic t, and the distances to the k nearest neighbors are averaged to account for the plurality of distances.

Given a query for classification, scoring the substrings of the query reduces noise such as personal detail, sentiment or other information provided by the customer that is irrelevant for the classification. Furthermore, limiting only to consecutive subtrees improves the likelihood that only the most syntactically and semantically relevant substrings are considered.

In operation 448, the data extraction module 172 determines whether there are more substrings to analyze. If so, then the process returns to operation 444 to select the next substring. If not, then the process returns the minimum distance among all the substrings as the affiliation score. As such, a lower affiliation score indicates a stronger affiliation between the chat description desc and the topic t, and therefore the interactions that were not initially assigned to a cluster can be assigned to the cluster with which it has the lowest affiliation score, if that affiliation score also satisfies a threshold value (e.g., below the threshold value).

Generating a Dialogue Tree

Referring to FIG. 3, having clustered the interactions into separate topics that are discussed in the contact center, in operation 350 a dialogue graph or dialogue tree can be generated for each and every topic. The dialogue graph or dialogue tree represents the various conversation paths (between agents and customers) associated with a given topic and can be used to create a separate chatbot for each topic (e.g., a collection of topic specific chatbots) in operation 370. The input to this phase is a collection of sample chats in the current topic, and the output is a directed acyclic graph (DAG) that represents the main conversation flows in the topic. The nodes of the graph are the sentences said by the agent side; the edges represent customers' responses.

Figure 5:
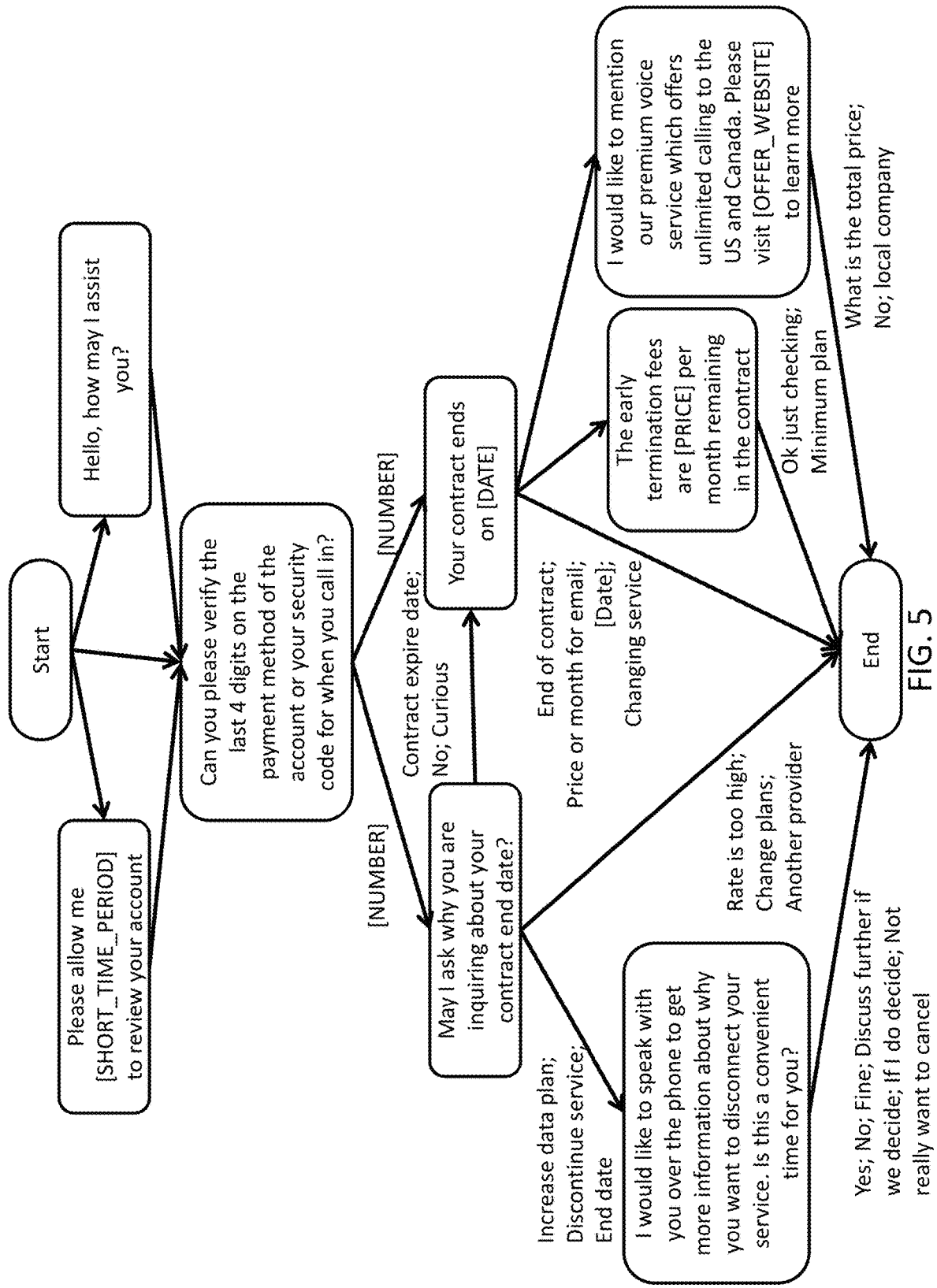
FIG. 5 is an example of a dialogue tree automatically extracted from interactions relating to a single topic, namely for inquiries on contract end dates.

FIG. 5 is an example of a dialogue tree automatically extracted from interactions relating to a single topic, namely for inquiries on contract end dates. In the example shown in FIG. 5, the text in rounded rectangles (agent nodes) identifies phrases or messages sent by an agent and the labeled arrows (customer edges) correspond to various customer messages that correspond to the transitions between different agent nodes. The thicknesses of the edges reflect the relative fractions of interactions that take the paths, where thicker edges correspond to larger portions of the interactions. As such, in some embodiments of the present invention, the dialogue graph is a directed acyclic graph (DAG), meaning that each of the edges has a direction (e.g., from one node to another), and that there are no cycles within the graph (e.g., there are no paths in the graph that contain the same node more than once).

Because the human agents have some flexibility in their approaches and may respond in different ways to the same types of responses from customers, there are some instances in which the same or similar customer messages leads to two different nodes. For example, when a customer provides his or her verification information (in the form of the last four digits of the payment method of the account or a security code), some agents ask why the customer is inquiring about the contract end date, while other agents respond immediately with the contract end date.

Figure 6:
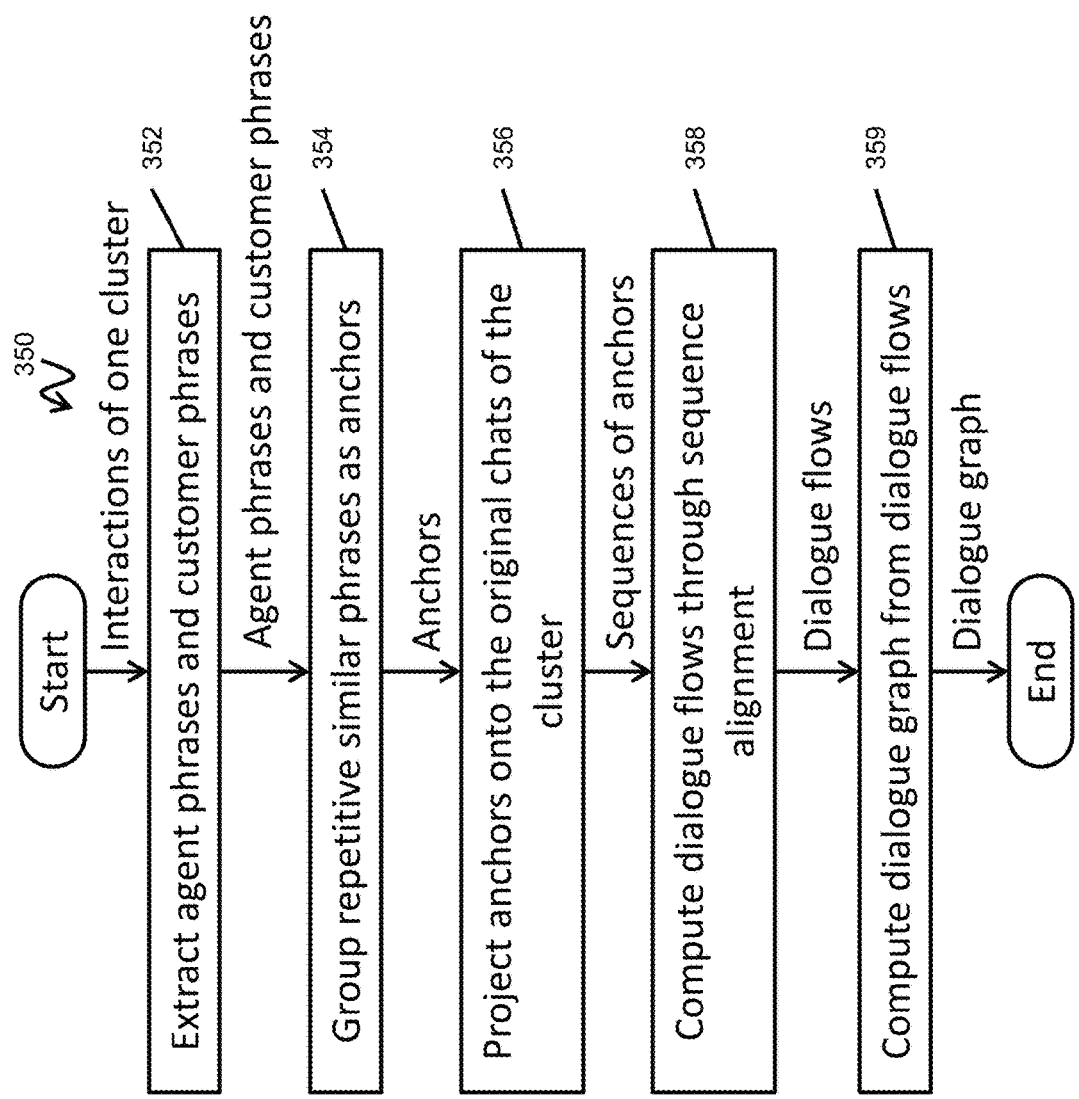
FIG. 6 is a flowchart of a method for generating a dialogue tree according to one embodiment of the present invention.

FIG. 6 is a flowchart of a method 350 for generating a dialogue tree according to one embodiment of the present invention.

According to one embodiment, in operation 352, the data extraction module 172 extracts agent phrases and customer phrases from the transcripts of the chat interactions.

In operation 354 the data extraction module 172 groups repetitive similar phrases that serve as the anchors of the graph. In some embodiments, the repetitive utterances are identified within the agent side of the interactions, because the agent utterances are generally much more consistent and exhibit less variability than the customer side.

In one embodiment, the grouping of similar phrases is performed using a clustering algorithm such as density-based spatial clustering of applications with noise (or DBScan) (see, e.g., Ester, Martin; Kriegel, Hans-Peter; Sander, Jörg; Xu, Xiaowei (1996). Simoudis, Evangelos; Han, Jiawei; Fayyad, Usama M., eds. *A density-based algorithm for discovering clusters in large spatial databases with noise*. Proceedings of the Second International Conference on Knowledge Discovery and Data Mining (KDD-96). AAAI Press. pp. 226-231) over the bag-of-words representations of the agent utterances, using an IDF based similarity measure. In some embodiments, Y-Clustering is used instead of DBScan.

In some embodiments, when comparing sentences for grouping, the n-grams of the sentences and/or the parse trees of the sentences may be used in the comparison. In some embodiments, lemmatization is applied to the words in the sentences prior to performing the comparison. In some embodiments, the sentences are classified as questions versus responses, where questions are not clustered with responses. In some embodiments, the intent classification the sentences may be clustered using supervised intent classification using training examples generated by a chatbot designer (e.g., manually or selected from a list of examples). In some embodiments, if the distance between two sentences is above a threshold value, a weight is given to their neighborhood, accounting for the number of shared neighbors and the number of occurrences of the two sentences (the more frequently those sentences appear, the more often shared neighbors may be found).

In operation 356, the clustering results are projected on the original chats: each sentence is replaced by its cluster's representative (e.g., the most frequently-appearing sentence in the cluster). The sentences occurring in at least a threshold percentage of the interactions are set as the anchors of the topic.

In some embodiments, the automatically identified anchors are displayed to a human chatbot designer through the user interface 176, and the chatbot designer can edit the computed anchors (e.g., edit the representative) or merge anchors that have the same meaning (but which may be separate anchors due to different wording).

Each interaction is represented by the sequence of anchors it contains. Sequences that commonly appear across the interactions in the cluster are then extracted for graph construction, where the agent anchors are used as nodes of the dialogue graph. In operation 358, patterns of sequences are extracted to generate a dialogue graph or dialogue tree.

In one embodiment of the present invention, the dialogue graph or dialogue tree is generated in accordance with a similar method for extracting dialogue trees from sequences as described, in the context of automatically generating dialogue trees for interactive voice response (IVR) systems, in U.S. patent application Ser. No. 14/919,673, "Data-Driven Dialogue Enabled Self-Help Systems," filed in the United States Patent and Trademark Office on Oct. 21, 2015, the entire disclosure of which is incorporated by reference herein.

In another embodiment of the present invention, conversations are treated as ordered sequences where each slot in the sequence may contain one of the anchors found in operation 354 or a gap. The sequences can be aligned using a multiple sequence alignment (MSA) technique, such as the Center Star alignment algorithm (see, e.g., D. Gusfield. Algorithms on Strings, Trees and Sequences. Cambridge University Press, New York, 1997) to identify similar subsequences (although not necessarily exact matches) that occur in many of the interactions.

For example, when applying the Center Star alignment algorithm, the alignment is computed in accordance with a sum of pairs ("pairwise") scoring function (approximated to a factor of two). In one embodiment, the pairwise scoring function is the sum of matches minus the sum of mismatches, insertions, and deletions in the sequences.

An example collection of sequences is shown in Table 5.

TABLE 5

HPONMFEQ

FDABC

ABIJQ

DABCQ

HPONMEQ

PONMFQ

KHFEQ

KHFEA

KHEDAQ

ONMCFEQ

PONMFE

TABLE 5-continued

PONMFGQ

HFPONMQ

Given the sequences shown in Table 5, a sequence alignment process generates the alignment shown in Table 6.

TABLE 6

| H | P | O | N | M | F |   | E | Q |
|   |   | F | D | A |   |   | B | C |
|   |   | A | B | I |   |   | J | Q |
|   |   | D | A | B |   |   | C | Q |
| H | P | O | N | M |   |   | E | Q |
|   | P | O | N | M |   |   | F | Q |
| K | H |   |   | F |   |   | E | Q |
| K | H |   |   | F |   |   | E | A |
| K | H |   |   | E | D |   | A | Q |
|   |   | O | N | M | C | F | E | Q |
|   | P | O | N | M | F |   | E |   |
|   | P | O | N | M | F |   | G | Q |
| H | F | P | O | N | M |   |   | Q |

As noted above with respect to FIG. 5, in one embodiment, nodes correspond to the agent side of the interaction and edges correspond to the customer side. With the agent side anchors are in place, in operation 359, the data extraction module 172 analyzes the customer side of the interactions to provide the edges or transitions between the nodes or anchors of the dialogue graph, where an edge connects two nodes if there is a direct transition between the nodes in the alignment. As such, the transitions can be thought of as representing the contexts in which an agent's utterance is followed by another utterance. Multiple outgoing edges from a node occur due to different human agents leading conversations down different paths or due to the customer responses.

Each transition or edge is summarized by extracting the keyphrases characterizing the customer utterances associated with the transition or edge. The keyphrases serve as a way to communicate, to the designer, the semantics of the transition between the agent states. In particular, for each edge (u, v) in the dialog graph, the data extraction module 172 collects all customers sentences that were in direct response to u and that were followed by v with no other anchors between them, and, in some embodiments, these sentences are displayed through the user interface 176 to assist the chatbot designer in understanding the motivation for transitioning from agent phrase u to agent phrase v.

In order to decrease the amount of text that is displayed to the chatbot designer to analyze (e.g., to avoid overwhelming the chatbot designer), the keyphrase extraction process described above with respect to FIG. 4A may be used to detect the important phrases in a set of sentences associated with the transition, except that, instead of taking only the largest connected component of the computed subgraph, the keyphrase histograms in all of the connected components (or the top keyphrases of the histogram) are returned, and may be displayed to the chatbot designer. As such, the extracted keyphrases guide the designer to quickly map the common customers' responses to agent sentences and decide on how the chatbot should respond, given a customer's input in a certain point in the dialog.

Configuring a Chatbot Based on a Dialogue Tree

In operation 370, the chatbot generation module 174 generates a topic-specific chatbot from a topic-specific dialogue graph generated by the data extraction module 172.

As described above, in one embodiment, nodes of the dialogue graph correspond to agent-side phrases, and edges between the nodes correspond to customer phrases that lead from one agent node to the next. In the example shown in FIG. 5, the node in which the agent requests verification of the account has an outgoing edge to a node where the agent asks the customer's reason for inquiring about their contract end date, where the outgoing edge is labeled with the customer's response, which includes a verification number (denoted "[NUMBER]" in FIG. 5).

In one embodiment, a chatbot is configured with a dialogue graph, where each node specifies a phrase or phrases that the chatbot should send to a customer, and where the edges indicate classes of customer responses. To select which outgoing edge to follow, the chatbot classifies the customer input and selects the edge that best matches the classification of the customer input. If there are no plausible matches, then the chatbot may ask for clarification or transfer the chat to a human agent.

While the chatbot handles an interaction, it may also store variables representing data associated with the particular interaction. A single chatbot can handle multiple interactions simultaneously or concurrently, where each interaction is associated with a collection of independent variables. For example, the chatbot may store, as one variable, a name of the customer involved in an interaction, and, as another variable, a customer identifier (or customer id) associated with the account of the customer participating in the interaction. Still another variable may be the newly generated password for the customer. These variables may be used to fill-in appropriate portions of the messages from the bot (e.g., inserting the customer's name at appropriate places to make the interaction feel more personal). The variables containing information about the customer can also be filled by retrieving information about the customer from a customer relationship management (CRM) database. The CRM database may be stored, for example, on the mass storage device 126. Furthermore, in some embodiments, the chatbot can modify the customer's data in the CRM database (e.g., if the chatbot receives updated contact information such as an email address or a mailing address from the customer, the chatbot may automatically update the CRM database accordingly).

The dialogue graph that was automatically or semi-automatically generated by data extraction module 172 represents flows of conversations that were found in the sample dialogue data or training data collected from interactions between human customers and human agents. As a result, these flows may include conversation paths that are not dependent on customer behavior. For example, when a customer indicates that he or she would like to reset their password, the agent may respond with the newly reset password, or the agent may confirm the customer's username first (without being asked).

On the other hand, a chatbot according to an embodiment of the present invention, in comparison to a human agent, is designed to make a deterministic choice at each stage in the interaction. For example, in response to a customer request to reset a password, the chatbot may be designed to always (e.g., deterministically) directly provide the newly reset password or to always confirm the customer's username first.

As such, in the process of generating a chatbot from the dialogue graph, the chatbot generation module 174 prunes (e.g., removes) or modifies the edges at each node of the dialogue graph in order to define deterministic paths for the chatbot to follow through the dialogue graph in order to conduct an interaction with a customer. The modifications may include, for example, modifying the collection of keyphrases characterizing a transition (e.g., to remove keyphrases or insert keyphrases), completely removing the edge, or adding a new edge between two nodes. Continuing the above example, the chatbot generation module 174 may modify the dialogue graph to remove the transition to the node where the agent responds with the newly reset password or to remove the transition to the node where the agent confirms the customer's username first. In some embodiments, the pruning is performed automatically by keeping the edge that corresponds to the sequences that occur most frequently in the sample dialogue data. For example, if, in the majority of the transcripts of the sample dialogue data, the agent responds with the newly reset password, then the edge to the node where the agent confirms the customer's username first is removed or pruned away.

The dialog graph contains many possible flows, mainly due to variability between the agents: the agent may or may not ask for the customer's inquiry reason; based on that reason, he may or may not choose to offer a phone call; and finally, he decides whether to up-sell another voice service product. The pruned dialogue tree organizes the agent's prompts in a consistent order.

Figure 7A:
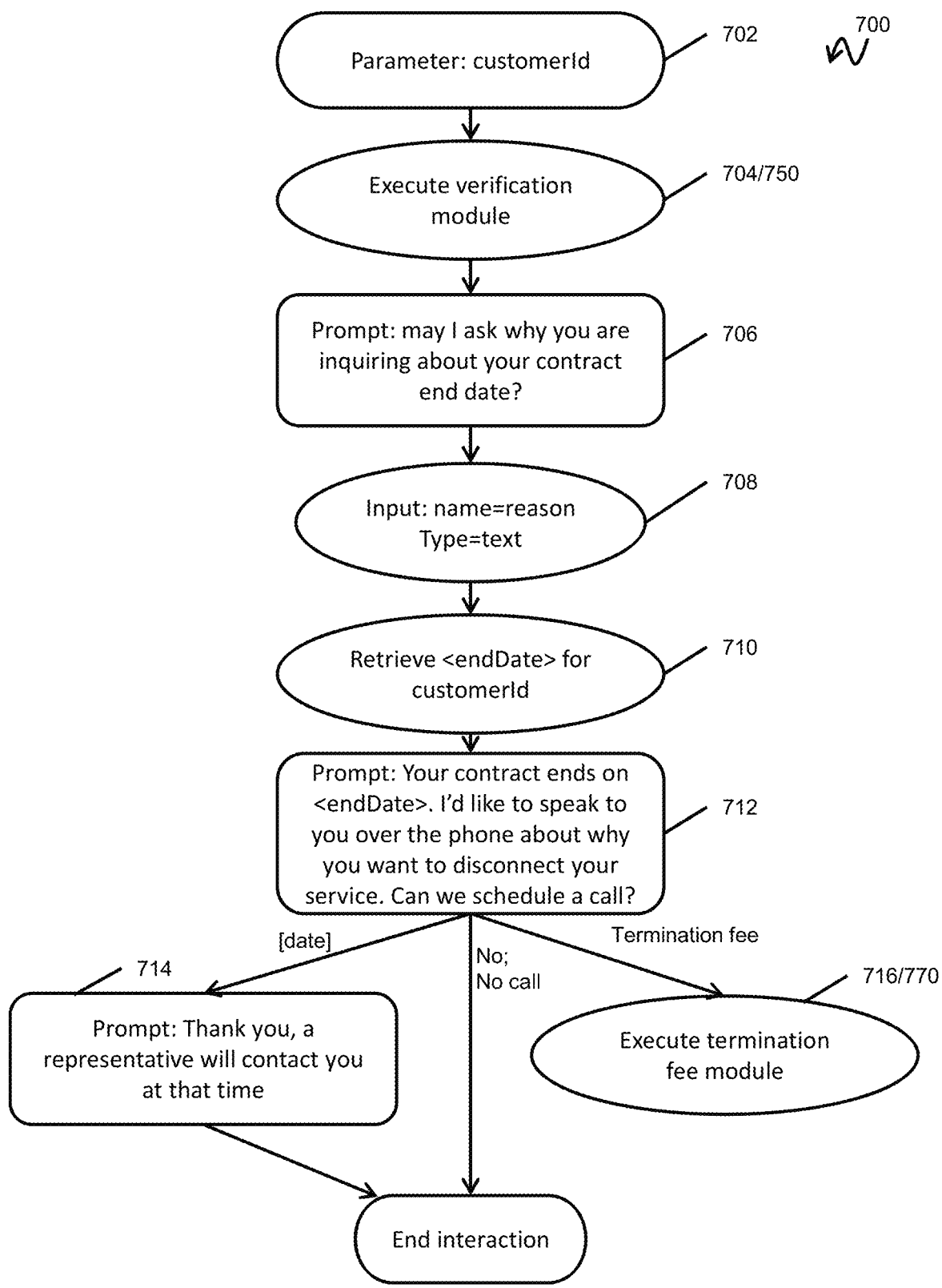
FIG. 7A is an example of a pruned dialogue tree that can be used to configure a chatbot according to one embodiment of the present invention.

FIG. 7A is an example of a pruned dialogue tree that can be used to configure a chatbot according to one embodiment of the present invention. The dialogue tree of FIG. 7A is based on the automatically extracted dialogue tree shown in FIG. 5. As shown in FIG. 7A, the pruned dialogue tree 700 may take in a customerId parameter in 702. In 704, the pruned dialogue tree may execute a verification "module" or subtree for providing verification of a customer, as described in more detail below with respect to FIG. 7B. In node 706, the chatbot prompts the customer by sending the message "may I ask why you are inquiring about your contract end date?" In 708, the chatbot accepts a text (e.g., free form) response from the customer and stores this customer response into a variable called "reason." The "reason" may be saved into the profile associated with the customer, as stored in the CRM database. In 710, the chatbot retrieves an <endDate> value for the given customerId. In node 712, the chatbot sends a message to the customer "Your contract ends on <endDate>. I'd like to speak to you over the phone about why you want to disconnect your service. Can we schedule a call?" At this point, there may be three different types of responses from the customer. The customer may provide a date (represented by the edge labeled "[date]" in FIG. 7A) for scheduling the call (the date may be specified by the customer using free text, or in another embodiment, graphically using Rich Communication Services or RCS), in which case the chatbot transitions to node 714 to confirm that a representative will call the customer at that time specified, and the interaction can then end. The customer may also ignore the request for a call or answer in the negative (e.g., "no" or "no call"), and the interaction will end. As a third option, the customer may ask about the "termination fee," in which case the chatbot may execute, in 716, the termination fee module 770 (described in more detail below with respect to FIG. 7C).

In some embodiments, selection of which edge to remove is based on the which transition appears more frequently in the interactions in the sample dialogue data. In other embodiments, the selection of which edge to remove is based on customer satisfaction information (e.g., a net promoter score) after the conclusion of the interaction. In still other embodiments, the chatbot designer can select which edge to retain and/or which edge to remove through the user interface 176.

In some embodiments of the present invention, the user interface 176 provides the human system administrator or designer an interface to refine the automatically generated dialogue tree and to add variables to the dialogue tree, integrate the dialogue tree with a customer relationship management (CRM) environment (e.g., a CRM database stored in the mass storage device 126) such that, for example, customer account information can be retrieved and integrated into the responses sent to the customer.

For example, the chatbot designer can characterize the transitions using sample responses, which the chatbot designer can derive from the computed keyphrases.

According to one embodiment of the present invention, the resulting pruned dialogue graphs are embedded into a chatbot associated with a particular topic. As noted above, the chatbot outputs messages to be transmitted to the customer in accordance with a current node of the graph, and transitions to next nodes of the graph by identifying an outgoing edge from the current node, where the identified outgoing edge best matches with the phrase supplied by the customer.

Figure 7B:
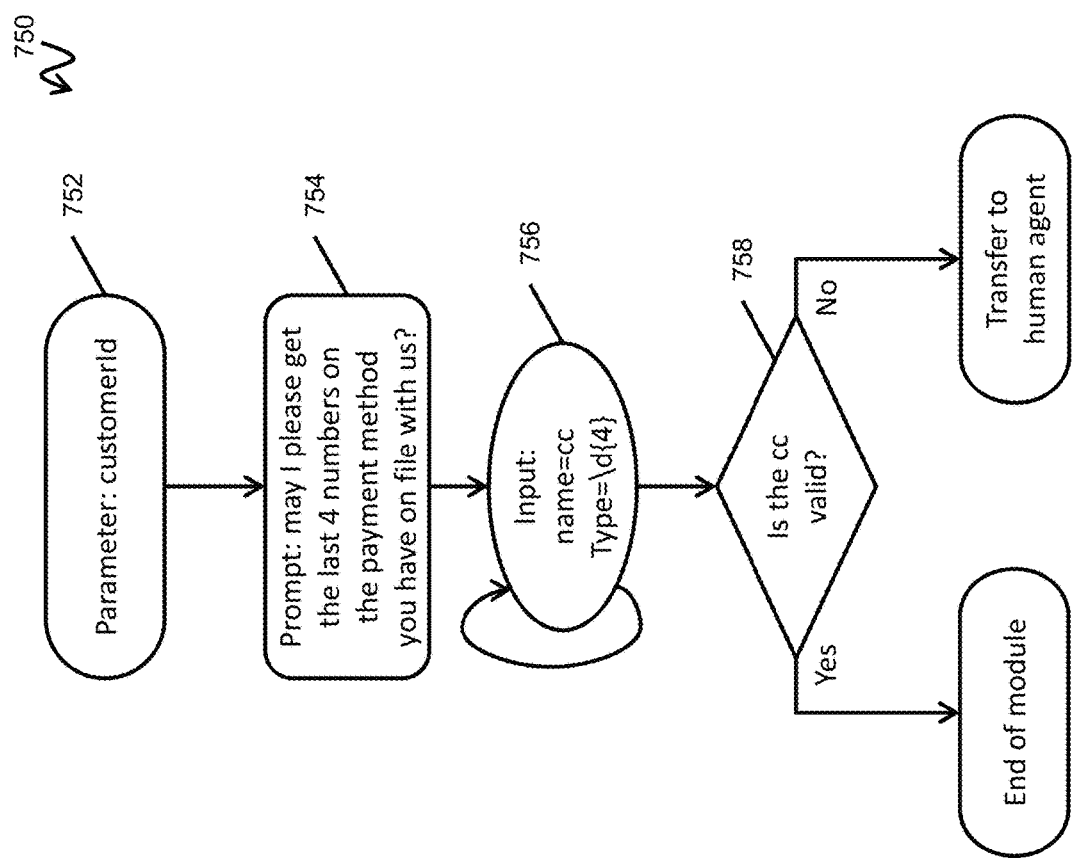
FIGS. 7B and 7C are examples of modules respectively for verifying a customer and reporting a termination fee where each module can be inserted into a dialogue tree for operating a chatbot according to one embodiment of the present invention.

The separate dialogue trees that are mined from different clusters (e.g., pertaining to different topics) may have common sub-portions, such as an identification or authentication portion at the start of the conversation, or an up-sell script at the end. As such, in some embodiments, these sub-portions are extracted as modules that can be reused when configuring the chatbot to handle new topics, thereby further reducing the time required to configure the chatbot (because the module is already configured). FIG. 7B is one example of a module for verifying a user based on the last four digits of a payment method, where the module was extracted from the beginning of the dialogue tree shown in FIG. 5. As shown in FIG. 7B, the module 750 may take in a customerId parameter in 752. In node 754, the chatbot sends, to the customer, the message "may I please get the last 4 numbers on the payment method you have on file with us?" In 756, the chatbot receives a response from the customer (756 may, formally, correspond to an edge of the dialogue graph). The received input is stored in the variable "cc" and the "Type" is specified to be four digits (denoted in FIG. 7B as "\d{4}" where "\d" indicates a digit and "{4}" indicates that the previous character class is repeated four times). In 758, the chatbot determines whether the given cc is valid, such as by comparing the value of cc with the payment method stored in the customer's profile (e.g., in the CRM database, as retrieved using the customerId parameter). If the cc value is valid, then the module is completed and the chatbot proceeds with the next node in the dialogue tree. If the cc value is not valid, then the chatbot may transfer the customer to a human agent.

Figure 7C:
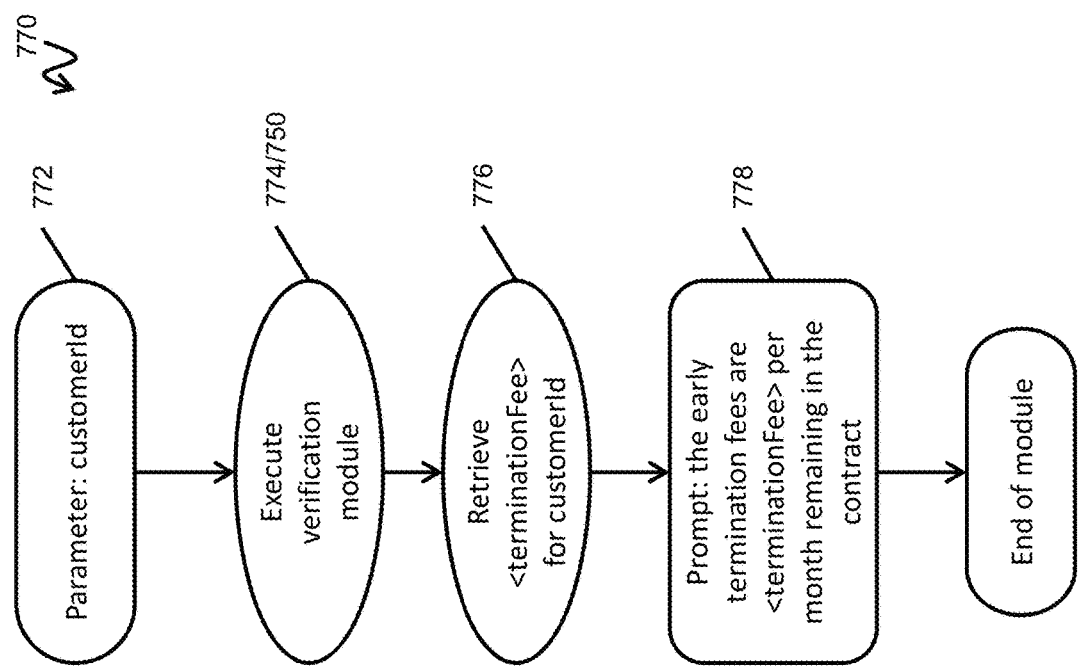

Most of the interaction shown in FIG. 5 is led by the agent, such as: requesting the credit card suffix; asking the reason for the customer's query; suggesting scheduling a call; and providing the contract end date. In this example, after the question is answered, the customer may take back the initiative and ask about a contract termination fee. The portion of the interaction corresponding to retrieving the termination fee can be exported as a module 770, as shown in FIG. 7C. For example, in 772, the termination fee module begins by taking in the same customerId parameter. In 774, the termination fee module may execute the verification module 750 described above with respect to FIG. 7B. In 776, assuming that verification succeeded in 774, the <terminationFee> for this particular <customerId> is retrieved (e.g., from the CRM database). In node 778, the chatbot sends, to the customer, a message "the early termination fees are <terminationFee> per month remaining in the contract", filling in the retrieved value of <terminationFee> to customize the message for the customer.

While the dialogue trees described above assume that the customer will behave in accordance with the patterns extracted from the sample dialogue data, actual customers do not necessarily follow the patterns captured in the dialogue trees. For example, when presented with a question, the customer may correct or change a response to a previous question, answer a question that has not yet been asked, or change the topic.

In addition, in some embodiments of the present invention, the chatbot also stores the context of the interaction over time (e.g., among the variables tracked by the chatbot). The context may include the set of answers (e.g., fields of data) that the chatbot expects at a given point in time, in a manner similar to a form-filling chatbot. If the customer provides an answer that is not expected given the current node, the answer can still be captured to fill-in the appropriate fields of data in the context. In one embodiment, the form filling is implemented as a special type of node in the dialogue tree that is configured to handle unexpected customer input and designed to supply a reasonable point for continuing the interaction after filling in the unexpected information.

As such, a dialogue graph or dialogue tree that is pruned as described above can be used to configure a chatbot such that the chatbot can deterministically send messages to customers and respond to customer messages in accordance with the associated dialogue graph.

The topic-specific chatbots generated in this way are stored in a collection of generated chatbots 178. When a new customer interaction is received (e.g., a new customer interaction), the chatbot service 170 selects one of the generated chatbots 178 by identifying a chatbot associated with a topic that matches the topic of the interaction. As noted above, the first message sent by the customer may be matched with one of the topic labels to identify a topic-specific chatbot. The chat can then proceed by starting a new instance of the topic-specific chatbot, which sends a message corresponding to the root node of its dialogue tree. As new messages arrive in the same interaction, the messages are sent to that instance of the chatbot, which maintains state information about the interaction (e.g., the values of the variables and the current position within the dialogue tree).

As noted above, in some instances, a single interaction may include multiple topics. As such, in some embodiments, during the interaction, the chatbot service 170 monitors for changes in topic, for example, based on detecting transitional phrases such a response to "is there anything else I can help you with today" or "can you help me with another issue?" The customer message following such a transitional phrase may be used as a description for automatically identifying another topic-chatbot of the generated chatbots 178, based on finding a topic that matches the description.

As such, aspects of embodiments of the present invention are directed to systems and methods for automatically and semi-automatically generating chatbots that are customized for a particular business environment based on sample dialogue data from the business environment.

Computing Devices

As described herein, various applications and aspects of the present invention may be implemented in software, firmware, hardware, and combinations thereof. When implemented in software, the software may operate on a general purpose computing device such as a server, a desktop computer, a tablet computer, a smartphone, or a personal digital assistant. Such a general purpose computer includes a general purpose processor and memory.

Each of the various servers, controllers, switches, gateways, engines, and/or modules (collectively referred to as servers) in the afore-described figures may be a process or thread, running on one or more processors, in one or more computing devices 1500 (e.g., FIG. 8A, FIG. 8B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 8A:
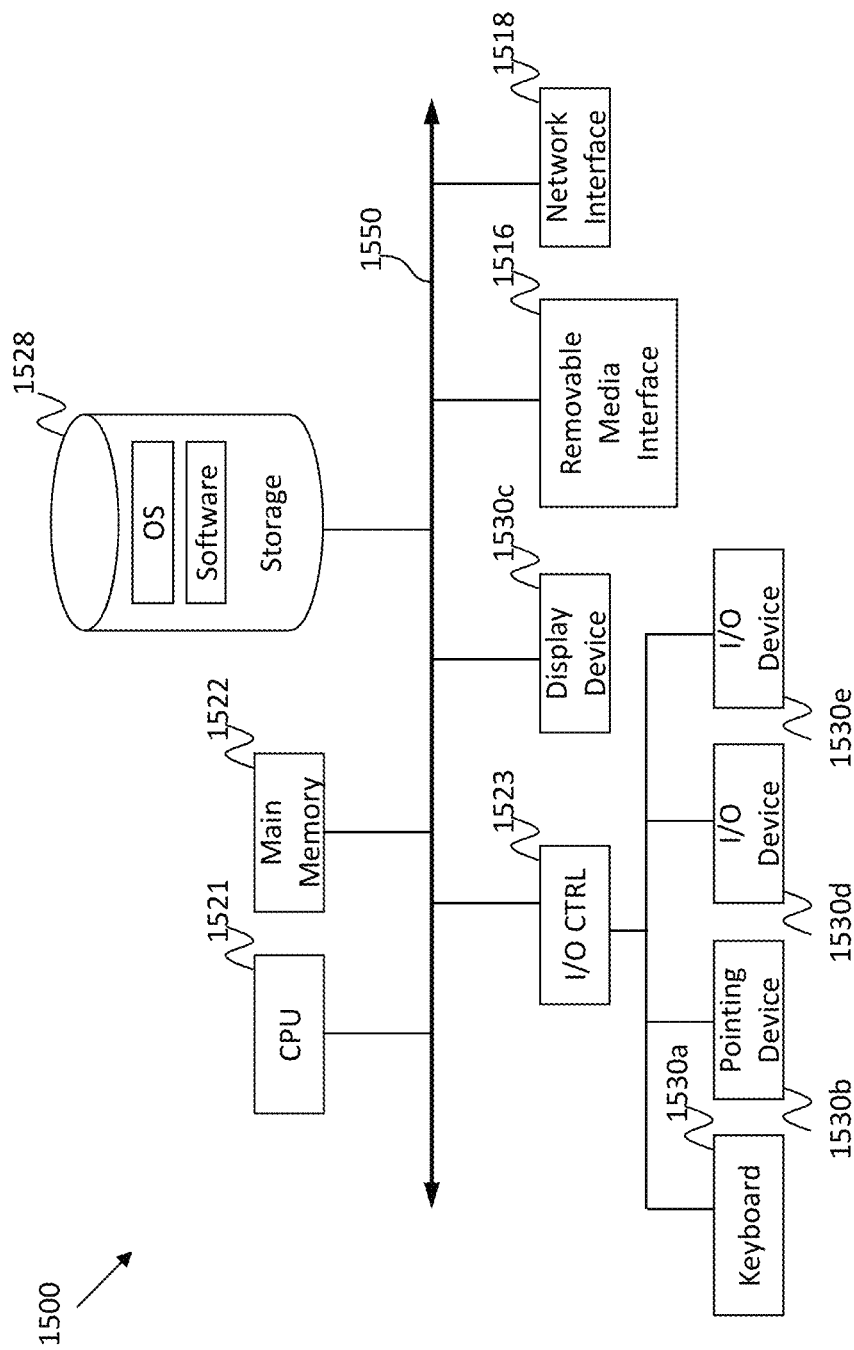
FIG. 8A is a block diagram of a computing device according to an embodiment of the present invention.
Figure 8B:
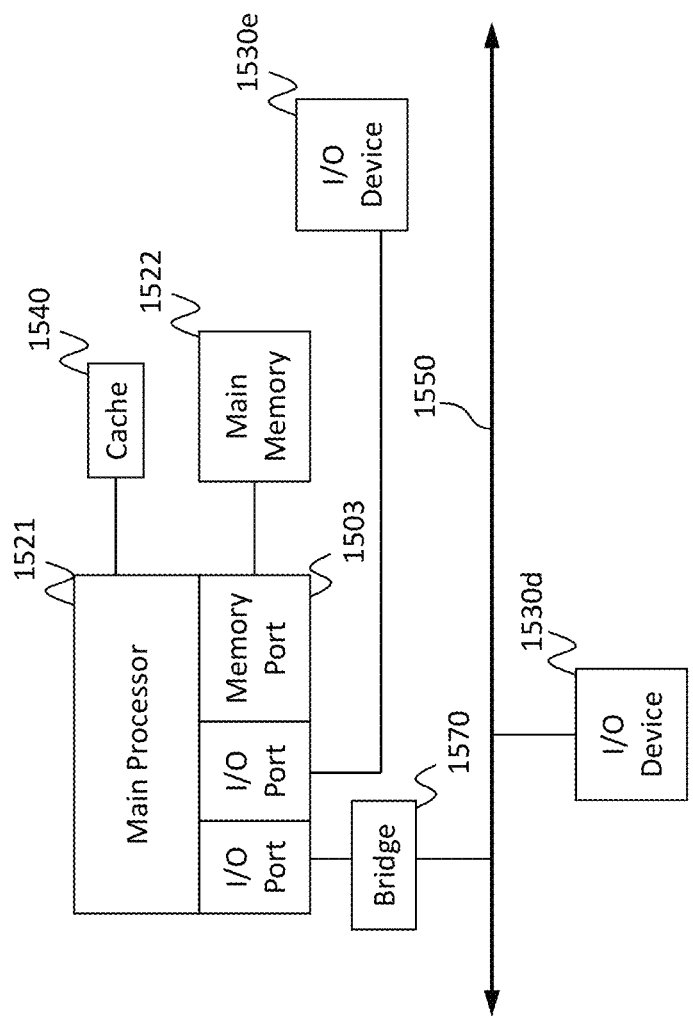
FIG. 8B is a block diagram of a computing device according to an embodiment of the present invention.

FIG. 8A-FIG. 8B depicts block diagrams of a computing device 1500 as may be employed in exemplary embodiments of the present invention. Each computing device 1500 includes a central processing unit 1521 and a main memory unit 1522. As shown in FIG. 8A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 8B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 8A, the central processing unit 1521 communicates with the main memory 1522 via a system bus 1550. As shown in FIG. 8B, the central processing unit 1521 may also communicate directly with the main memory 1522 via a memory port 1503.

FIG. 8B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 8A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 8B depicts an embodiment of a computer 1500 in which the central processing unit 1521 communicates directly with I/O device 1530e. FIG. 8B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 8A, may control the I/O devices. The I/O controller may control one or more I/O devices such as a keyboard 1530a and a pointing device 1530b, e.g., a mouse or optical pen.

Referring again to FIG. 8A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further include a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may include or be connected to multiple display devices 1530c, which each may be of the same or different type and/or form. As such, any of the I/O devices 1530 and/or the I/O controller 1523 may include any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect, or otherwise use the display devices 1530c. In one embodiment, a video adapter may include multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 8A-FIG. 8B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 includes a combination of devices, such as a mobile phone combined with a digital audio player or portable media player.

Figure 8C:
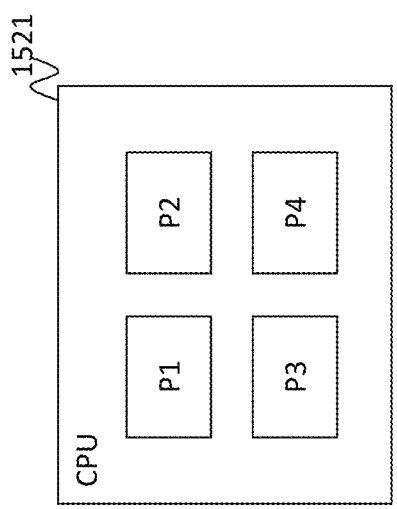
FIG. 8C is a block diagram of a computing device according to an embodiment of the present invention.
Figure 8D:
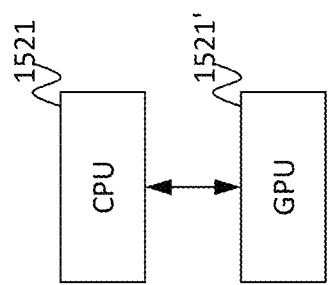
FIG. 8D is a block diagram of a computing device according to an embodiment of the present invention.

As shown in FIG. 8C, the central processing unit 1521 may include multiple processors P1, P2, P3, P4, and may provide functionality for simultaneous execution of instructions or for simultaneous execution of one instruction on more than one piece of data. In some embodiments, the computing device 1500 may include a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 includes a multicore microprocessor, which combines two or more independent processors into a single package, e.g., into a single integrated circuit (IC). In one exemplary embodiment, depicted in FIG. 8D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 8E:
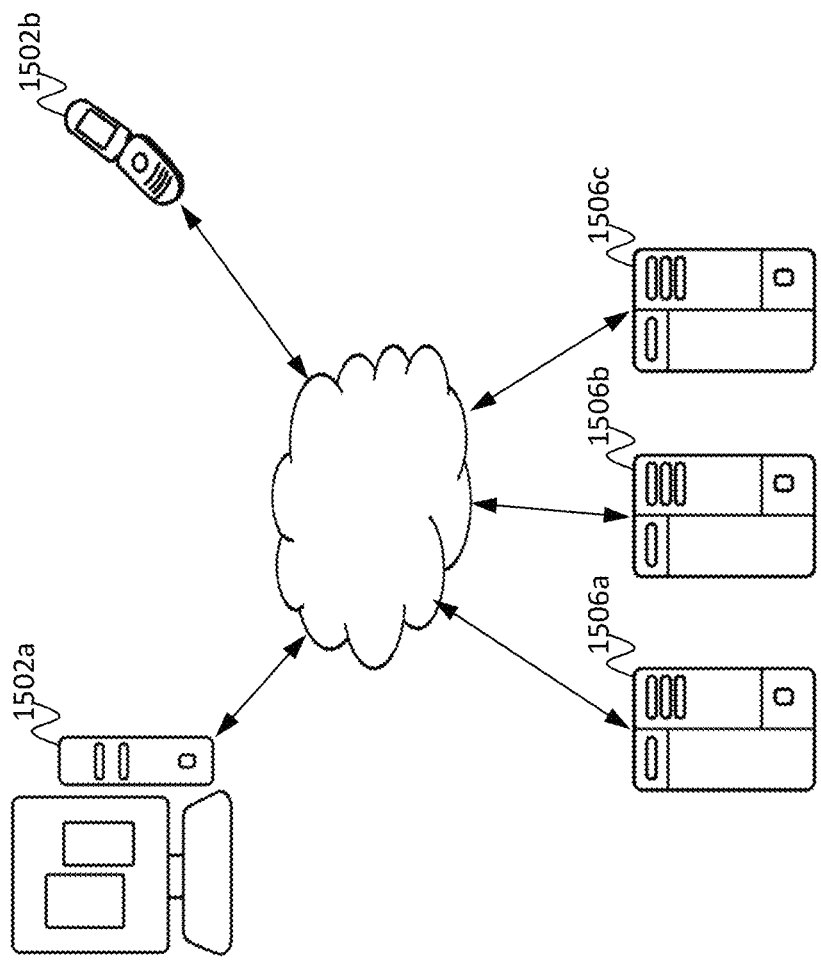
FIG. 8E is a block diagram of a network environment including several computing devices according to an embodiment of the present invention.

A computing device may be one of a plurality of machines connected by a network, or it may include a plurality of machines so connected. FIG. 8E shows an exemplary network environment. The network environment includes one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 8E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may include a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 8E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for constructing a deterministic dialogue tree for generating a chatbot, using a plurality of transcripts of interactions between a first party and a second party, the method comprising the steps of:
grouping similar phrases of phrases comprising the interactions from the first party of a cluster;
for each group of similar phrases:
computing a percentage of interaction of the cluster containing at least one phrase from the group of similar phrases;
determining whether the percentage exceeds a threshold occurrence rate; and
in response to determining that the percentage exceeds the threshold occurrence rate, generating an anchor corresponding to the group of similar phrases;
projecting the anchors onto the interactions of the cluster to represent the interactions as sequences of anchors;
computing dialogue flows by aligning the sequences of anchors representing the interactions of the clusters;
computing a topic-specific dialogue tree from the dialogue flows, wherein:
each node of the topic-specific dialogue tree corresponds to one of the anchors, and
each edge of the topic-specific dialogue tree connects a first node of the topic-specific dialogue tree to a second node of the topic-specific dialogue tree, and the edge corresponds to a plurality of keyphrases characterizing the customer phrases appearing, in the transcripts, in response to the first party phrases of the anchor corresponding to the first node and the first party phrases of the anchor corresponding to the second node are in response to the second party phrases of the edge; and
modifying the topic-specific dialogue tree to generate the deterministic dialogue tree;
outputting the chatbot, the chatbot being configured to use the deterministic dialogue tree to automatically generate responses to messages from a customer.

2. The method of claim 1, further comprising:
displaying, on a user interface, respective labels of the clusters;
receiving a command to edit a label of the labels; and
updating the label of the labels in accordance with the command.

3. The method of claim 1, wherein the modifying comprising pruning the topic-specific dialogue tree.

4. The method of claim 3, wherein the pruning the topic-specific dialogue tree comprises:
identifying nodes of the topic-specific dialogue tree having at least two outgoing edges having overlapping customer phrases, each of the outgoing edges connecting a corresponding first node to a corresponding second node;
identifying one edge from among the at least two outgoing edges corresponding to sequences of first party phrases of the second nodes of the at least two outgoing edges most frequently observed in the transcripts of the cluster and identifying the remaining edges among the at least two outgoing edges; and
removing the remaining edges from the tropic-specific dialogue tree.

5. The method of claim 3, wherein the pruning the topic-specific dialogue tree comprises:
identifying a first edge and second edge having overlapping customer phrases, the first edge corresponding to sequences of first party phrases most frequently observed in the transcripts of the cluster; and
removing the second edge.

6. The method of claim 1, wherein the modifying the topic-specific dialogue tree comprises modifying the phrases characterizing a transition.

7. The method of claim 6, wherein the modifying phrases comprises inserting phrases.

8. The method of claim 6, wherein the modifying phrases comprises removing phrases.

9. The method of claim 1, wherein the modifying the topic-specific dialogue tree comprises adding a new edge between two nodes.

10. The method of claim 4, wherein the pruning of the topic-specific dialogue tree further comprises:
displaying the topic-specific dialogue tree on a user interface;
receiving, via the user interface, a command to modify the topic-specific dialogue tree; and
updating the topic-specific dialogue tree in accordance with the command.

11. The method of claim 5, wherein the pruning of the topic-specific dialogue tree further comprises:
displaying the topic-specific dialogue tree on a user interface;
receiving, via the user interface, a command to modify the topic-specific dialogue tree; and updating the topic-specific dialogue tree in accordance with the command.

12. A system comprising:
a processor; and
memory storing instructions that, when executed by the processor, cause the processor to construct a deterministic dialogue tree for generating a chatbot using a plurality of transcripts of interactions between a first party and a second party, including instructions that cause the processor to:
group similar phrases of phrases comprising the interactions from the first party of a cluster;
for each group of similar phrases:
compute a percentage of interaction of the cluster containing at least one phrase from the group of similar phrases;
determine whether the percentage exceeds a threshold occurrence rate; and
in response to determining that the percentage exceeds the threshold occurrence rate, generating an anchor corresponding to the group of similar phrases;
project the anchors onto the interactions of the cluster to represent the interactions as sequences of anchors;
compute dialogue flows by aligning the sequences of anchors representing the interactions of the clusters;
compute the topic-specific dialogue tree from the dialogue flows, wherein:
each node of the topic-specific dialogue tree corresponds to one of the anchors, and
each edge of the topic-specific dialogue tree connects a first node of the topic-specific dialogue tree to a second node of the topic-specific dialogue tree, and the edge corresponds to a plurality of keyphrases characterizing the customer phrases appearing, in the transcripts, in response to the first party phrases of the anchor corresponding to the first node and the first party phrases of the anchor corresponding to the second node are in response to the second party phrases of the edge; and
modify the topic-specific dialogue tree to generate a deterministic dialogue tree;
output the chatbot, the chatbot being configured to use the deterministic dialogue tree to automatically generate responses to messages from a customer.

* * * * *